United States Patent [19]
Horimoto

[11] Patent Number: 5,645,302
[45] Date of Patent: Jul. 8, 1997

[54] COUPLING APPARATUS

[75] Inventor: Akira Horimoto, Nishinasunomachi, Japan

[73] Assignee: Sakura Rubber Co., Ltd., Tokyo, Japan

[21] Appl. No.: 429,304

[22] Filed: Apr. 26, 1995

[30] Foreign Application Priority Data

Apr. 27, 1994 [JP] Japan ................................ 6-089529
Mar. 17, 1995 [JP] Japan ................................ 7-086264

[51] Int. Cl.$^6$ ............................................. F16L 35/00
[52] U.S. Cl. ...................... 285/70; 285/317; 285/316; 285/9.1; 285/38; 285/906
[58] Field of Search ................................ 285/70, 71, 72, 285/73, 74, 75, 76, 78, 79, 81, 82, 84, 85, 86, 308, 316, 317, 9.1, 38

[56] References Cited

U.S. PATENT DOCUMENTS

| | | | |
|---|---|---|---|
| 1,362,521 | 12/1920 | Zadora | 285/85 |
| 1,584,278 | 5/1926 | Dessaints | 285/79 |
| 1,587,079 | 6/1926 | Machino . | |
| 1,857,420 | 5/1932 | Wolford | 285/85 |
| 2,449,920 | 9/1948 | Williams | 285/169 |
| 2,868,563 | 1/1959 | Wood | 285/70 X |
| 3,171,674 | 3/1965 | Bilkel et al. | 285/317 X |
| 3,177,011 | 4/1965 | Ogne | 285/70 |
| 3,181,895 | 5/1965 | Cator | 285/9.1 X |
| 3,472,530 | 10/1969 | Fowler | 285/317 X |
| 3,612,579 | 10/1971 | Groves | 285/81 X |
| 4,159,131 | 6/1979 | Huttlin | 285/70 X |
| 5,005,877 | 4/1991 | Hayman | 285/315 |
| 5,419,354 | 5/1995 | Krynicki | 285/9.1 X |

FOREIGN PATENT DOCUMENTS

| | | |
|---|---|---|
| 425421 | 6/1972 | Australia . |
| 525808 | 2/1954 | Belgium . |
| 0337055 | 10/1989 | European Pat. Off. . |
| 0530485 | 10/1993 | European Pat. Off. . |
| 327557 | 6/1903 | France . |
| 413969 | 8/1910 | France . |
| 2011234 | 10/1970 | Germany . |
| 005401 | of 1910 | United Kingdom . |
| 1533785 | 11/1978 | United Kingdom . |
| 8001311 | 6/1980 | WIPO ................................ 285/316 |

Primary Examiner—Dave W. Arola
Attorney, Agent, or Firm—Ladas & Parry

[57] ABSTRACT

A coupling apparatus is constituted by a pair of couplers. The pair of couplers have substantially the same structure and are complementary to each other. A cylindrical body of each coupler has at least a pair of locking pieces projecting in an axial direction and locking pieces engageable with the locking pieces. When the pair of couplers are abutted against each other in the axial direction and the locking pieces of one coupler are engaged with the locking pieces of the other coupler, the pair of couplers are coupled to each other.

19 Claims, 21 Drawing Sheets

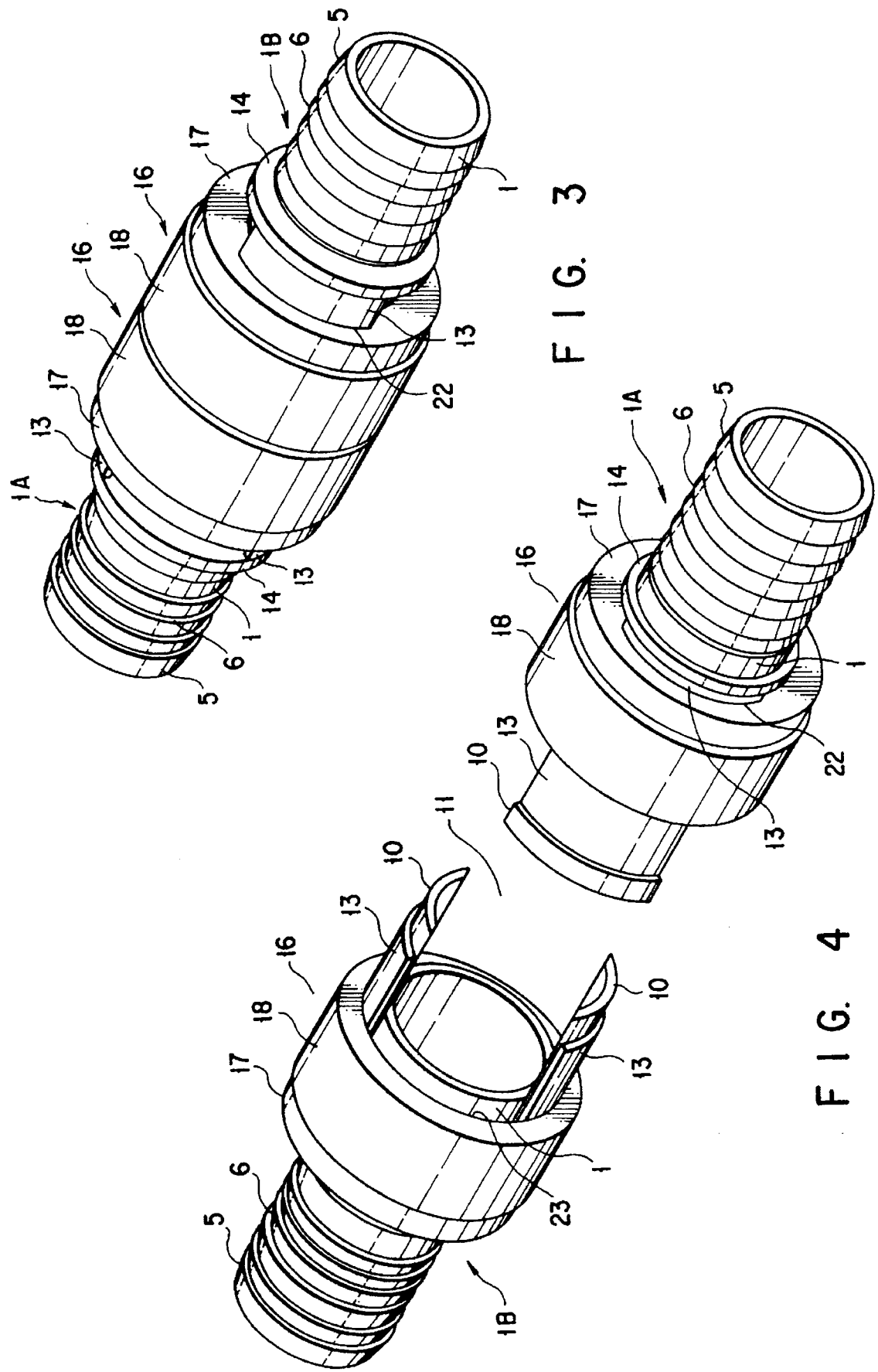

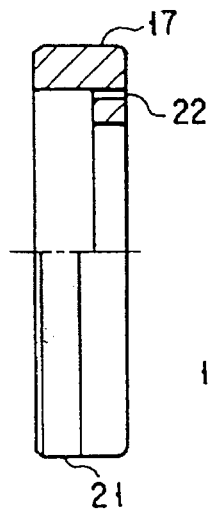
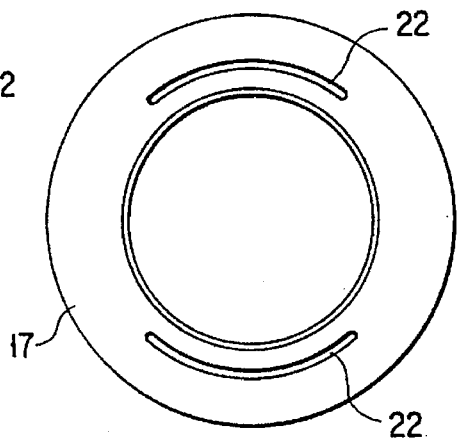
FIG. 5A2   FIG. 5A1
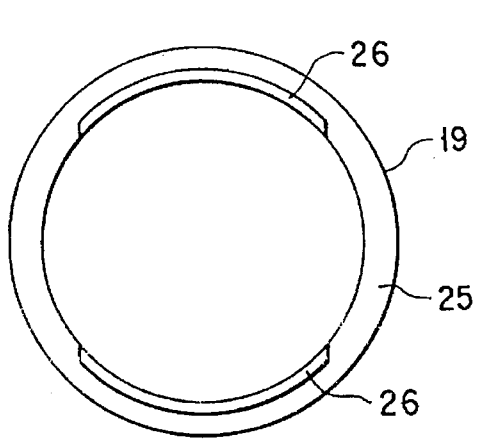
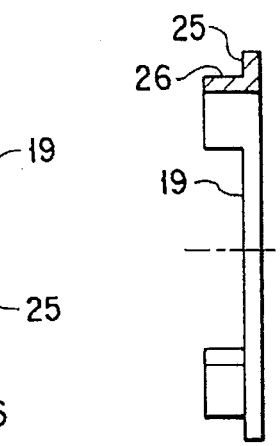
FIG. 5B1   FIG. 5B2
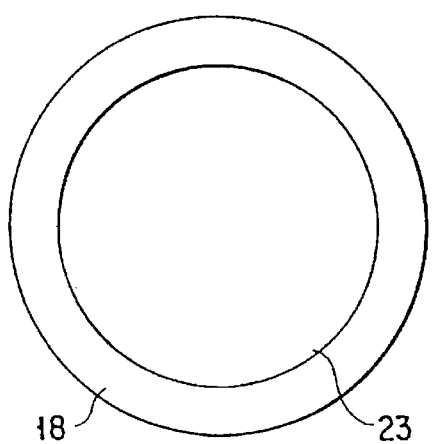
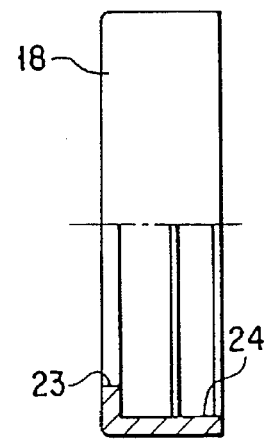
FIG. 5C1   FIG. 5C2

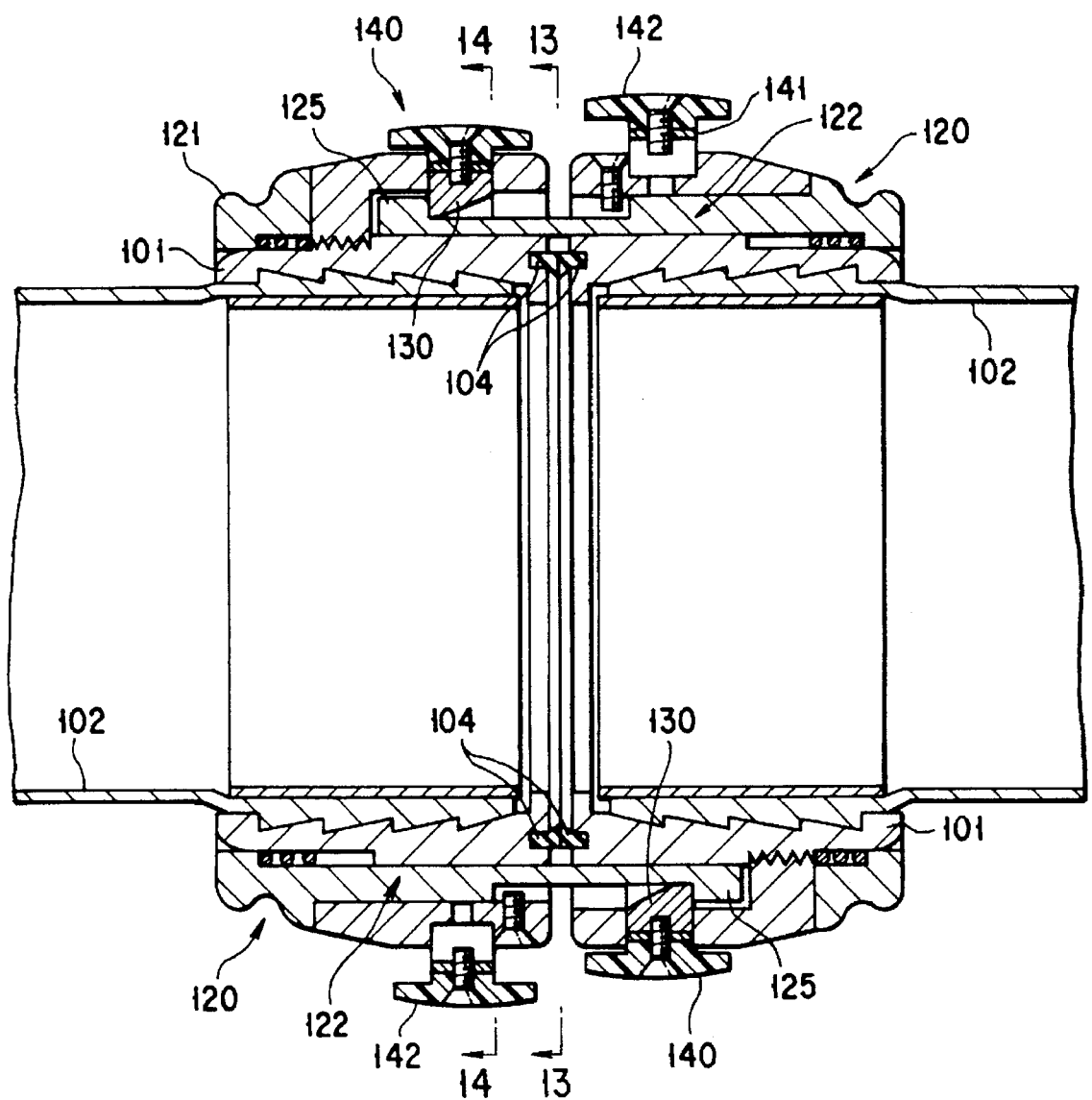
F I G. 11

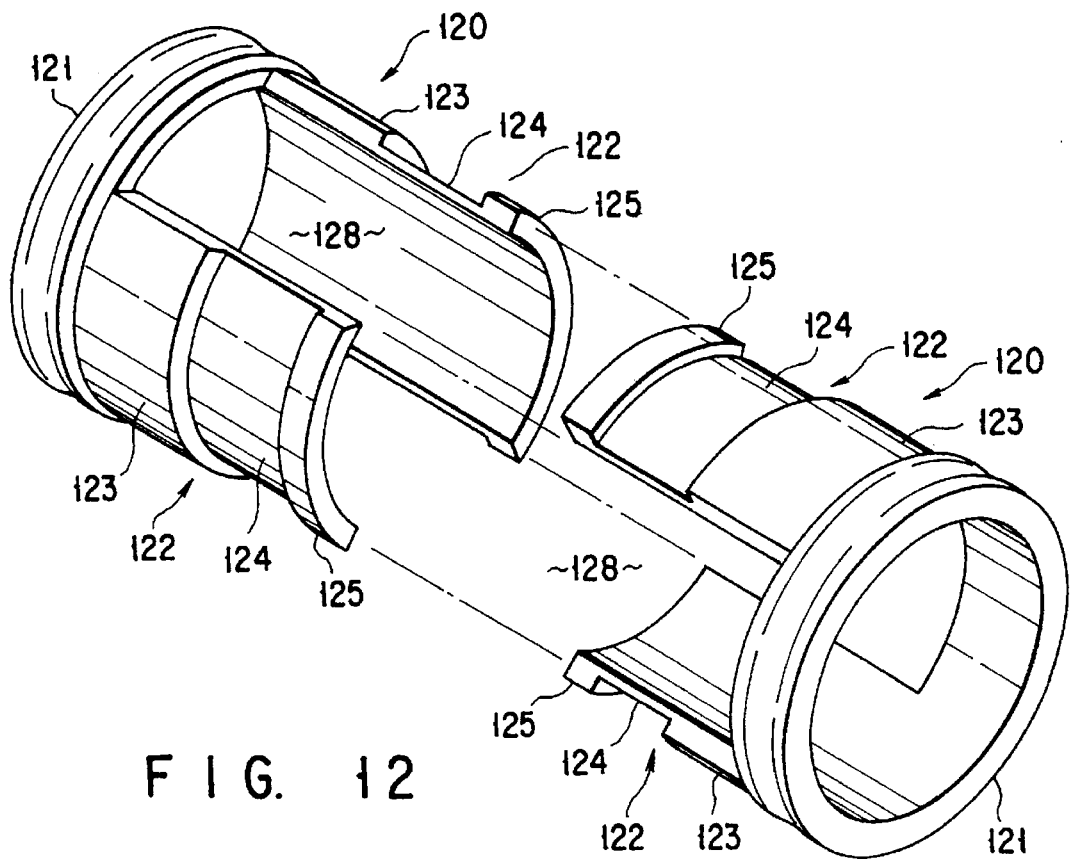
F I G. 12
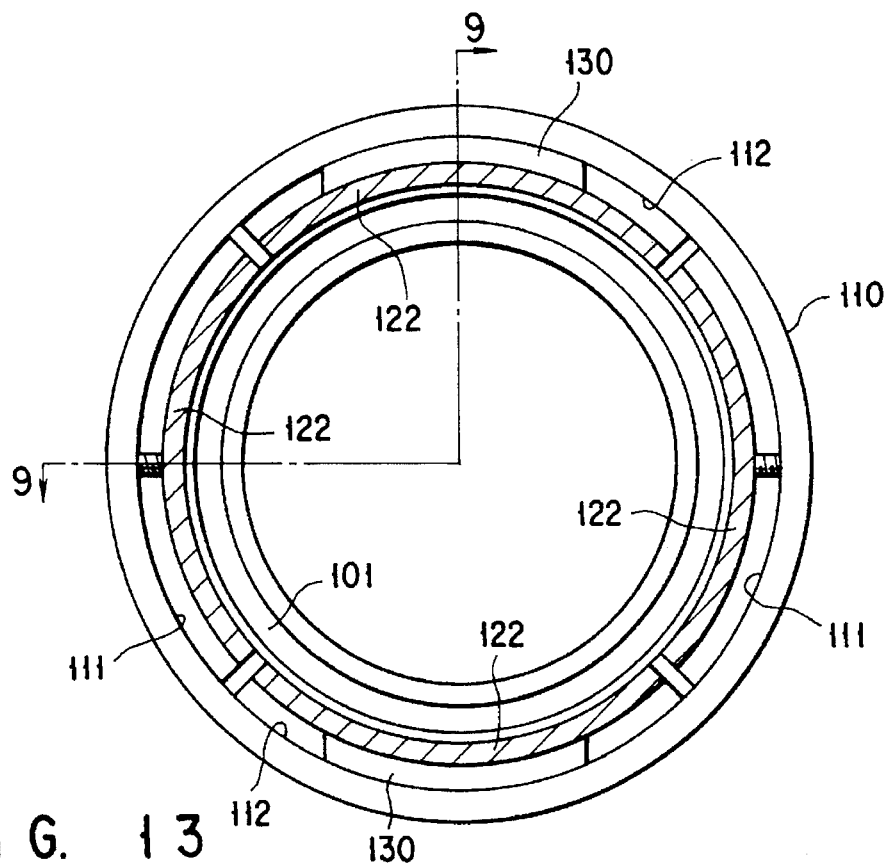
F I G. 13

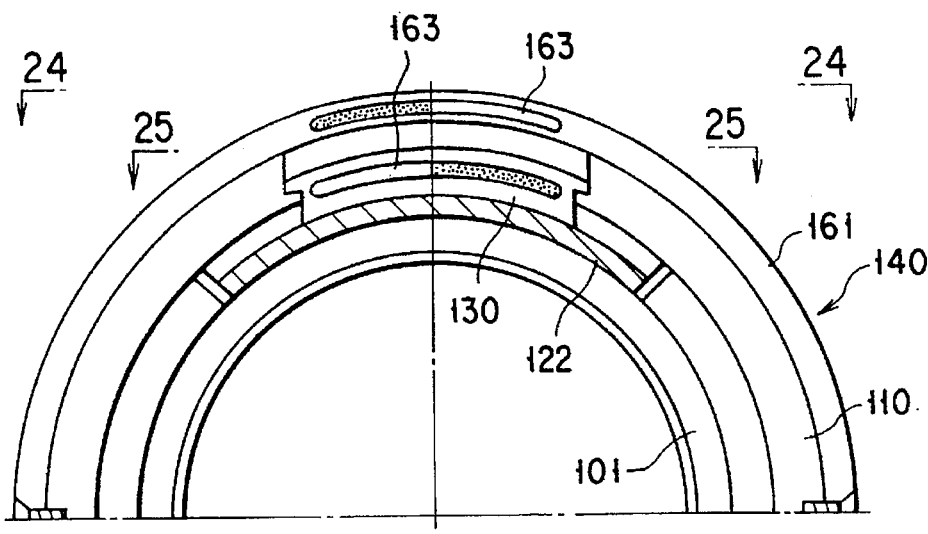
F I G. 22
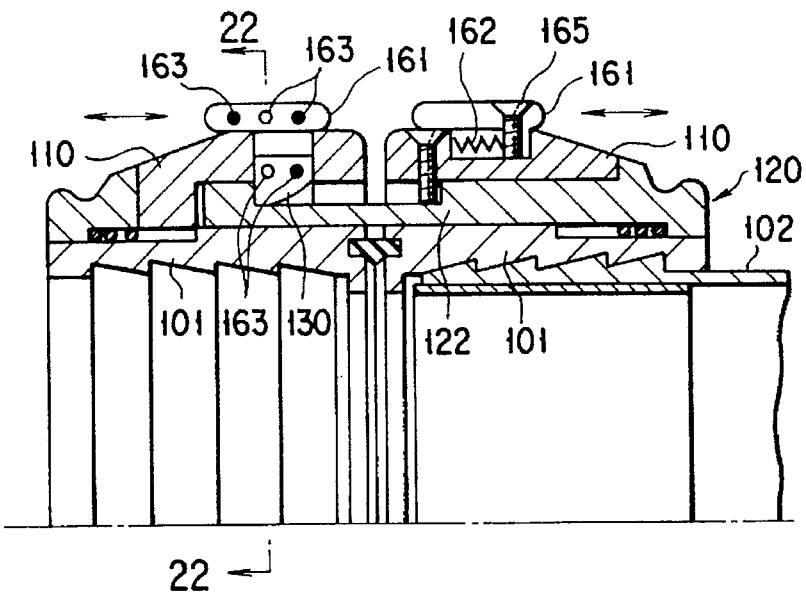
F I G. 23
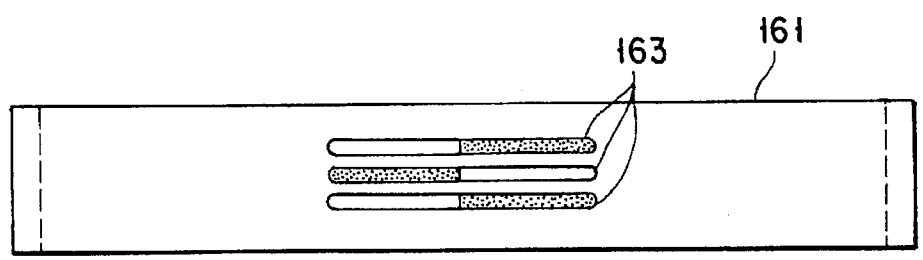
F I G. 24
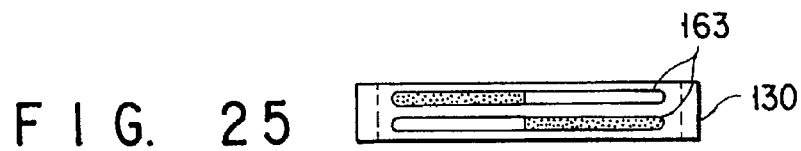
F I G. 25

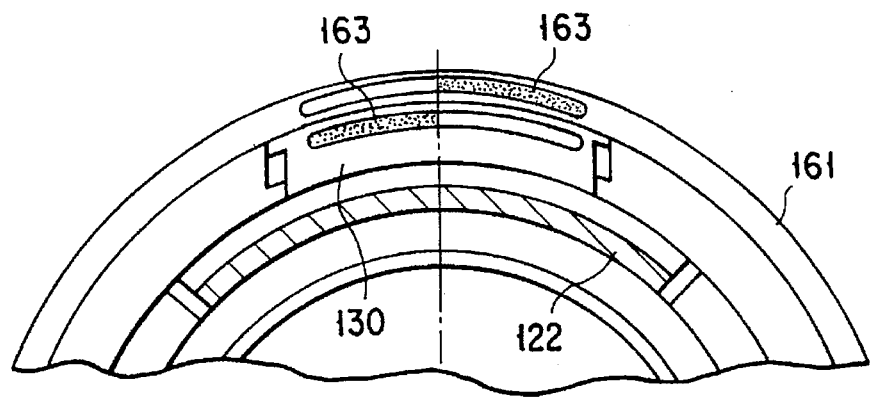
F I G. 26
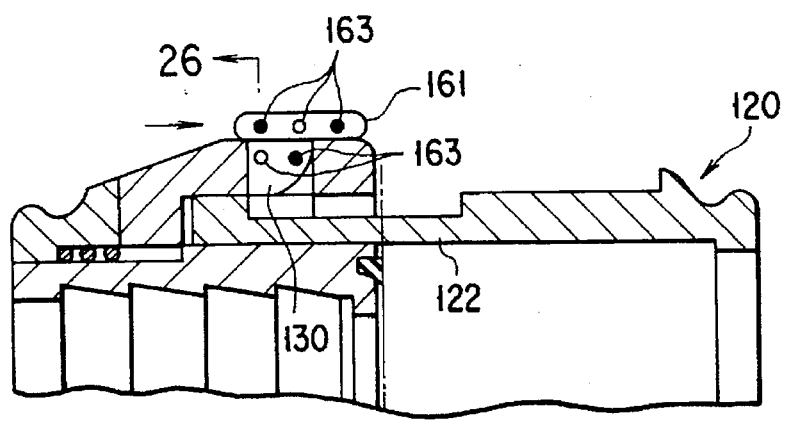
F I G. 27
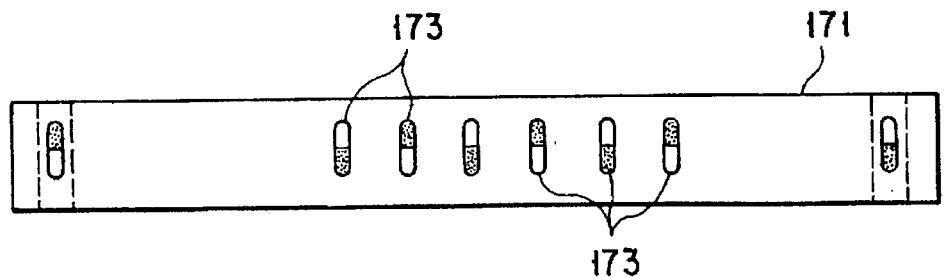
F I G. 30
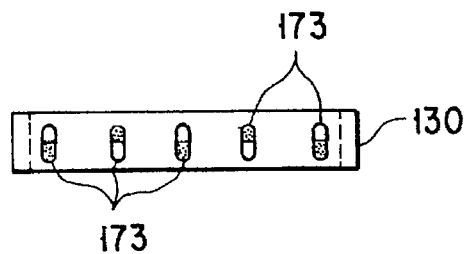
F I G. 31

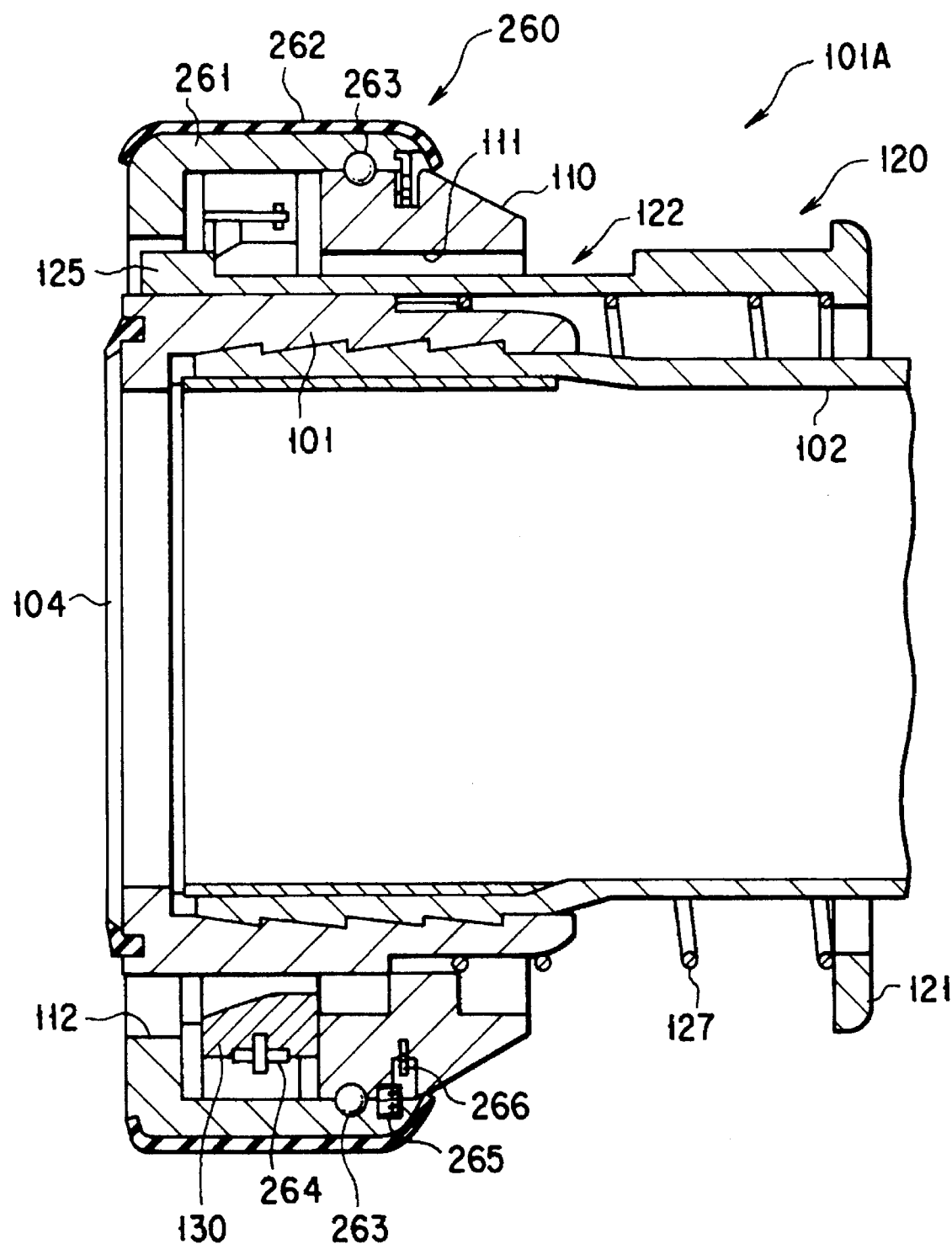
F I G. 38

COUPLING APPARATUS

BACKGROUND OF THE INVENTION

1. Field of the Invention

The present invention relates to a coupling apparatus for coupling two members, e.g., hoses such as fire hoses, or a pump and a hose to each other.

More specifically, the present invention is constituted by a pair of couplers which have the same structure and are complementary. These couplers are axially fitted and coupled to each other.

2. Description of the Related Art

As a hose coupling apparatus for coupling fire hoses to each other, conventionally, ones which are disclosed in, e.g., Jpn. UM Appln. KOKOKU Publication No. 63-37593, Jpn. UM Appln. KOKAI Publication No. 64-53593, Jpn. UM Appln. KOKOKU Publication No. 2-34549, Jpn. UM Appln. KOKAI Publication No. 59-193443, and the like are known.

Each of Jpn. UM Appln. KOKOKU Publication No. 63-37593 and Jpn. UM Appln. KOKAI Publication No. 64-53593 discloses hose couplers having substantially the same structures.

In these couplers, a rotational ring is rotatably fitted on the outer circumferential surface of a cylindrical main body of each coupler, and a pair of locking pawls and a pair of wedge-shaped projecting ridges are provided to this rotational ring. When the two rotational rings are rotated, the locking pawls of one rotational ring are fitted with the wedge-shaped projecting ridges of the other rotational ring, thereby coupling the pair of couplers to each other.

The hose couplers disclosed in each of Jpn. UM Appln. KOKOKU Publication No. 2-34549 and Jpn. UM Appln. KOKAI publication No. 59-193443 have basically and substantially the same structures and are constituted by a male coupler and a female coupler. A locking projection is formed on the male coupler, and a locking pawl to fit on the locking projection is provided to the female coupler. When the male and female couplers are axially abutted against each other, the locking projection and the locking pawl are fitted to each other, thereby coupling the male and female couplers.

According to the former couplers, the pair of couplers are positioned and abutted against each other, and the rotational rings are rotated to fit the locking pawls on the wedge-shaped projecting ridges. Operations for coupling and disconnecting the couplers are cumbersome. Thus, these couplers are not suitable as couplers which must quickly couple hoses, e.g., fire hoses, or disconnect them.

The fire hose is often dragged during fire fighting. If the locking pawls project as in the former coupler, the locking pawls tend to be interfered by obstacles. Then, the locking pawls may be deformed or broken to undesirably disconnect the couplers. In the former couplers, since the locking pawls project from the rotational rings in the cantilevered manner, when a high pressure is applied to the hose, a bending load acts on the locking pawl portions to bend the locking pawls. Then, the clamped state of the couplers can be loosened, leading to water leakage.

According to the latter couplers, the locking projection and the locking pawl are fitted to each other only by axially abutting the male and female couplers against each other, thereby coupling the male and female couplers. The coupling and disconnecting operations of the couplers are simple when compared to the operations of the former couplers. However, in the latter couplers, disengaging pieces for disengaging the locking projection from the locking pawls are provided to be axially slidable. When the fire hose is dragged during fire fighting, the disengaging pieces are slid to disengage the locking projection from the locking pawl, so that these couplers may be undesirably separated from each other.

In the latter couplers, a male coupler is attached to one end portion of the hose, and a female coupler is attached to the other end portion of the hose. When a plurality of hoses are to be connected to obtain an extended hose, the male coupler of one hose must be coupled to the female coupler of the other hose. In particular, when the latter couplers are applied to the couplers for fire hoses, if a plurality of hoses are to be straightened and coupled to each other in a haste, the two couplers sometimes turn out to be male couplers and thus cannot be coupled to each other. In the latter couplers, two types of metal members, i.e., female and male couplers, must be manufactured, leading to an increase in cost.

SUMMARY OF THE INVENTION

It is an object of the present invention to improve the inconveniences described above and to provide a coupling apparatus constituted by a pair of complementary couples having the same structure with no distinction between male and female couplers, in which the pair of couplers can be coupled to and disconnected from each other by a single operation and which has a simple structure to reduce a cost.

In order to achieve the above object, according to the present invention, there is provided a coupling apparatus comprising a pair of couplers, wherein the pair of couplers have substantially the same structure, each of the cylindrical bodies of the couplers has at least a pair of axially projectable locking members and to-be-locked members engageable with the locking members, and when the pair of couplers are axially abutted against each other and the locking members of one coupler are fitted with the to-be-locked members of the other coupler, the pair of couplers are coupled.

When the present invention is applied to a hose coupling apparatus, disengaging mechanisms for disengaging the locking members from the to-be-locked members are provided.

Preferably, the locking members are axially movable with respect to the cylindrical bodies and biased by springs to move backward in a direction opposite to the distal ends of the cylindrical bodies. When the couplers are in a disconnected state, the locking members are moved backward with respect to the cylindrical bodies, and the distal end portions of the locking members are maintained in a state not projecting from the cylindrical bodies. When the couplers are in a coupled state, the locking members are moved forward toward the distal ends of the cylindrical bodies against the biasing force of the springs and engage with the to-be-locked members of the opposite couplers. Thus, while these couplers are disconnected from each other, the locking members are prevented from being damaged.

Preferably, the disengaging mechanisms include disengaging pieces movable in the axial direction of the cylindrical bodies. When the disengaging pieces are axially moved, they are brought into contact with the to-be-locked members to set the to-be-locked members in a disengaged state, thereby disengaging the to-be-locked members from the locking members. In this case, more preferably, the disengaging pieces are moved in directions to come close to each other, thereby disengaging the locking members and the to-be-locked members of the two couplers from each other. Therefore, for example, even if this coupling apparatus is caught by something when a fire hose is dragged, the disengaging pieces of the two couplers will not axially move to disengage the locking members from the to-be-locked members of the two couplers simultaneously, and these couplers will not be undesirably disconnected from each other.

Preferably, in the disengaging mechanisms, the to-be-locked members are moved outwardly in the radial direction of the cylindrical bodies, thereby disengaging the to-be-locked members from the locking members. Alternatively, the to-be-locked members are rotated in the circumferential direction of the cylindrical bodies, thereby disengaging the to-be-locked members from the locking members. In this coupling apparatus, coupled couplers will be prevented from being undesirably disconnected from each other when the fire hose is dragged, in the same manner as described above.

Preferably, when the pair of couplers are coupled to each other, the distal end faces of their cylindrical bodies are abutted against each other through packing members. Hence, when these couplers are to be coupled, they need not be fitted to each other. Resistance during coupling is decreased, and the coupling operation is facilitated.

Preferably, the pair of couplers have protection cylinders located at least inside or outside the locking members and the to-be-locked members to reinforce these members. Thus, even when a high pressure is applied to the hose, the locking members and the to-be-locked members will not be bent to loosen the couplers, causing water leakage.

Furthermore, preferably, the pair of couplers have communication wire terminals at the end faces of their cylindrical bodies. When the couplers are coupled to each other, the connection terminals of the two couplers are connected to each other. As a result, e.g., voice communication with a fire fighter spraying water with the fire hose is enabled.

The pair of couplers of the coupling apparatus of the present invention have the same structure and are complementary to each other. The cylindrical bodies of the couplers have at least the pair of locking members and the to-be-locked members engageable with the locking members. Thus, when the locking members of one coupler are positioned in the to-be-locked members of the other coupler and the couplers are axially abutted against each other, the locking members and the to-be-locked members are locked with each other, thereby coupling the couplers.

The locked state of the locking members and the to-be-locked members is released by the disengaging mechanisms provided to the cylindrical bodies, so that the coupled couplers can be disconnected from each other easily.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a perspective view of the coupling metal members in the coupled state of the first embodiment;

FIG. 4 is a perspective view of the metal members in the disconnected state of the first embodiment;

FIGS. 5A to 5C respectively include front and sectional views of components constituting a protection cylinder of the first embodiment;

FIG. 11 is a longitudinal sectional view of the coupling metal members in the coupled state according to the fourth embodiment of the present invention;

FIG. 12 is a perspective view of the locking members of the coupling metal members according to the fourth embodiment of the present invention;

FIG. 13 is a sectional view taken along the line 13—13 of FIG. 11;

FIG. 22 is a cross-sectional view of disengaging mechanisms according to the sixth embodiment of the present invention;

FIG. 23 is a longitudinal sectional view of the disengaging mechanisms according to the sixth embodiment of the present invention;

FIG. 24 is a sectional view taken along the line 24—24 of FIG. 22;

FIG. 25 is a sectional view taken along the line 25—25 of FIG. 22;

FIG. 26 is a cross-sectional view of another state of the disengaging mechanisms according to the sixth embodiment of the present invention;

FIG. 27 is a longitudinal sectional view of this another state of the disengaging mechanisms according to the sixth embodiment of the present invention;

FIG. 30 is a sectional view taken along the line 30—30 of FIG. 28;

FIG. 31 is a sectional view taken along the line 31—31 of FIG. 28;

FIG. 38 is a longitudinal sectional view of the ninth embodiment of the present invention;

DETAILED DESCRIPTION OF THE PREFERRED EMBODIMENTS

Figure 1:
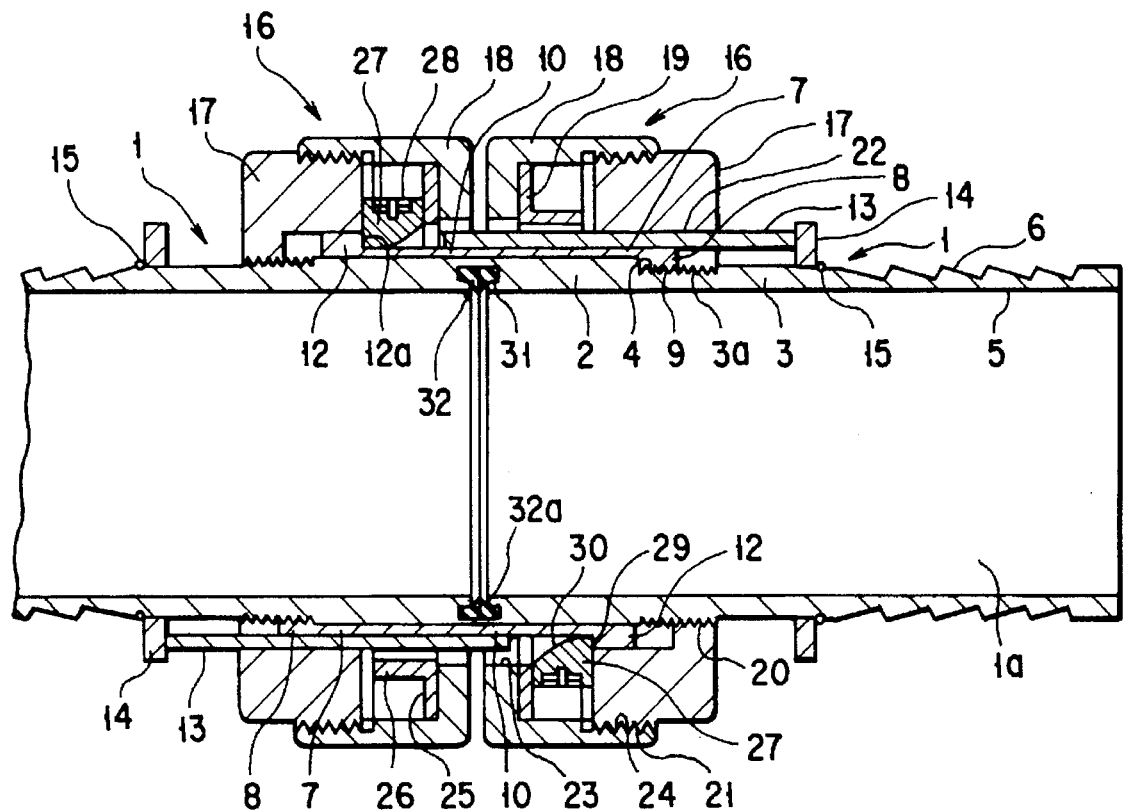
FIG. 1 is a longitudinal sectional view of coupling metal members according to the first embodiment of the present invention.
Figure 2:
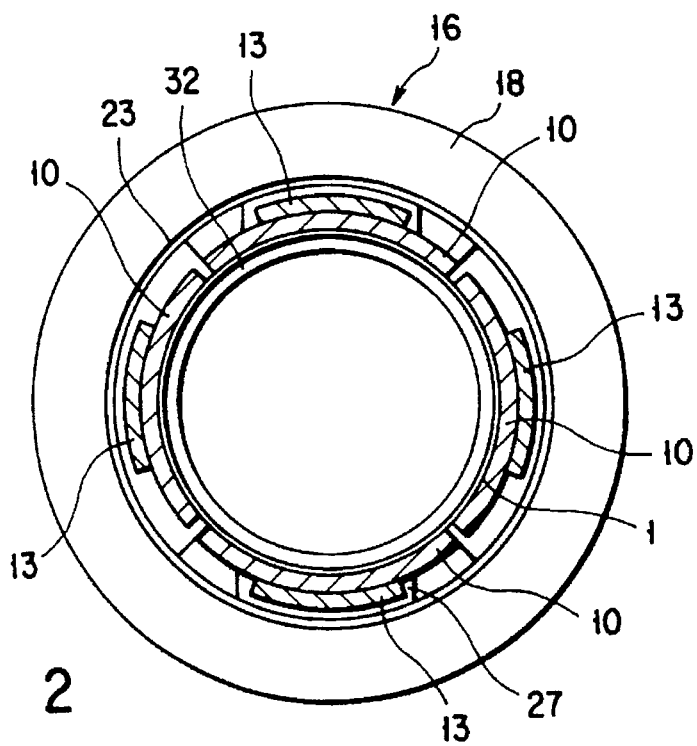
FIG. 2 is a cross-sectional view of the coupling metal members of the first embodiment.

The preferred embodiments of the present invention will be described with reference to the accompanying drawings. FIGS. 1 to 6 show the first embodiment which is a coupling apparatus for fire hoses. FIG. 1 is a longitudinal sectional view of the fire hose coupling apparatus, FIG. 2 is a cross-sectional view of the same, FIG. 3 is a perspective view of the coupled state of the same, FIG. 4 is a perspective view of the disconnected state of the same, and FIGS. 5 and 6 include views of components. This hose coupling apparatus is constituted by a pair of couplers 1A and 1B.

Figure 6A:
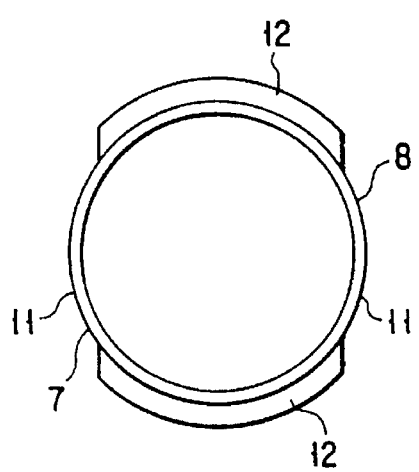
FIGS. 6A and 6B are includes front and sectional views of locking members of the first embodiment.
Figure 6B:
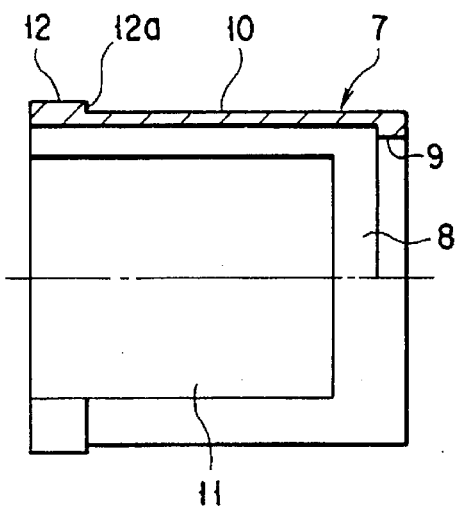

As the pair of couplers 1A and 1B have the same structure and the same shape, one of the couplers will be described. The coupler is entirely made of a lightweight metal material, e.g., aluminum, or a synthetic resin material. Reference numeral 1 denotes a cylindrical body. The cylindrical body 1 has a cylindrical shape and an inner cylindrical portion 1a for allowing a fluid, e.g., water, to flow therein. A proximal end portion 2 of the cylindrical body 1 has a larger diameter than that of an intermediate portion 3 having a threaded portion 3a. A stepped portion 4 is formed at the boundary between the proximal end portion 2 and the intermediate portion 3. A corrugated portion 6 having a saw-tooth section is formed on the outer circumferential surface of a distal end portion 5 of the cylindrical body 1, and a fire hose (not shown) is to be fitted on this distal end portion 5. A cylindrical locking body 7 is fitted on the proximal end portion 2 of the cylindrical body 1. As shown in FIGS. 6A and 6B, the cylindrical locking body 7 has an annular portion 8 in which the proximal end portion 2 of the cylindrical body 1 is to be fitted. An annular projecting portion 9 to be brought into contact with the stepped portion 4 of the cylindrical body 1 is provided on the inner circumferential surface of the annular portion 8.

A pair of locking pieces 10 serving as the locking members are provided to the cylindrical locking body 7 to axially project from the annular portion 8. The pair of locking pieces 10 are symmetrical about the axis of the cylindrical body 1 as the center and arcuately formed to cover about ½ the outer circumference of the cylindrical body 1. Accordingly, one locking piece 10 has an arcuated section in an angular range of about 90° in the circumferential direction. The pair of locking pieces 10 are arranged to be separated from each other by about 180° in the circumferential direction. Notched portions 11 are formed between the pair of locking pieces 10, and the opposite locking pieces 10 are fitted in these notched portions 11. Predetermined gaps are formed between the opposite locking pieces 10 in the circumferential direction. These gaps are set at appropriate sizes so that the locking pieces 10 will guide the opposite locking pieces and will not interfere with or catch the opposite locking pieces. Locking projecting portions 12 are integrally provided on the outer circumferential surfaces at the distal end portions of the locking pieces 10.

Disengaging mechanisms are provided which disengage the locking pieces 10 from to-be-locked members (to be described later), thereby disengaging these couplers from each other. Each disengaging mechanism has a pair of disengaging pieces 13. These disengaging pieces 13 have substantially the same width as that of the locking pieces 10 and an arcuated shape having the same radius of curvature as that of the locking pieces 10. Each disengaging piece 13 is placed on the outer side of the corresponding locking piece 10. Each disengaging piece 13 is axially slidable with respect to the corresponding locking piece 10. The front end face of each disengaging piece 13 can be brought into contact with a side surface 12a of the corresponding locking projecting portion 12, and the rear end face thereof projects backward from the annular portion 8 of the corresponding cylindrical locking body 7 and is in contact with a disengaging ring 14 fitted on the intermediate portion 3 of the corresponding cylindrical body 1. The two disengaging rings 14 are movable in the axial and circumferential directions of the intermediate portions 3 and can push the pair of disengaging pieces 13 simultaneously. Each disengaging ring 14 is prevented from being removed from the corresponding cylindrical body 1 by a removal preventing ring 15.

A protection cylinder 16 is provided on the outer circumferential surface of the proximal end portion 2 of the cylindrical body 1. As shown in FIGS. 5A to 5C, the protection cylinder 16 is constituted by a first cylindrical body 17, a second cylindrical body 18, and a retaining ring 19 interposed between the first and second cylindrical bodies 18 and 19. The first cylindrical body 17 has an L-shaped section. A threaded portion 20 to threadably engage with the threaded portion 3a of the cylindrical body 1 is formed on the inner circumferential surface of the first cylindrical body 17, and a threaded portion 21 to threadably engage with the second cylindrical body 18 is formed on the outer circumferential surface of the first cylindrical body 17. Furthermore, arcuated elongated holes 22, in which the disengaging pieces 13 can be slidably inserted, are formed in the side surface of the first cylindrical body 17. The second cylindrical body 18 also has an L-shaped section. A circular opening 23 is formed in the side surface of the second cylindrical body 18 to surround the outer sides of the locking pieces 10 of the cylindrical locking body 7, and a threaded portion 24 to threadably engage with the threaded portion 21 of the first cylindrical body 17 is formed on the inner circumferential surface of the second cylindrical body 18.

The retaining ring 19 has a pair of retaining pieces 26 integrally projecting from its ring main body 25. The retaining pieces 26 have an arcuate shape to extend along the inner circumferential surface of the ring main body 25 and correspond to the locking pieces 10 of the cylindrical locking body 7. Furthermore, locking pieces 27, formed into an arcuated shape to correspond to the locking pieces 10 of the cylindrical locking body 7 and serving as the to-be-locked members, are held in notched portions between the pair of retaining pieces 26 of the retaining ring 19. These locking pieces 27 are biased by elastic members, e.g., plate springs 28, inwardly in the radial direction of the cylindrical body 1.

Each locking piece 27 has a locking portion 29 to lock with the side surface 12a of the locking projecting portion 12 of the corresponding locking piece 10, and an inclined surface 30 opposing the distal end face of the corresponding disengaging piece 13. The pair of cylindrical bodies 1 are coupled by locking the locking projecting portions 12 of the locking pieces 10 and the locking portions 29 of the locking pieces 27. When the locking pieces 27 are retreated outwardly in the radial direction by the distal end faces of the disengaging pieces 13 against the biasing force of the plate springs 28, the pair of cylindrical bodies 1 are disconnected from each other.

Annular grooves 31 are formed in the end faces of the proximal end portions 2 of the cylindrical bodies 1, i.e., in the faces of the cylindrical bodies 1 that oppose each other when the pair of cylindrical bodies 1 are coupled. An annular packing member 32 is buried in each annular groove 31. The packing member 32 has a lip portion 32a which integrally projects from its proximal portion 31a buried in the annular groove 31 and has a triangular section. The lip portion 32a is inclined toward the axis of the cylindrical body 1.

The operation of the hose coupling apparatus having the above arrangement will be described. The cylindrical bodies 1 having the same structure are mounted at the two end portions of a fire hose. In this case, the two end portions of the fire hose are fitted on the distal end portions of the cylindrical bodies 1, and are clamped with clamping rings or the like on them.

When a plurality of fire hoses are to be coupled, the pair of couplers 1A and 1B are placed to oppose each other, and the locking pieces 10 of one coupler 1A (1B) are positioned in the notched portions 11 of the other coupler 1B (1A). When the pair of couplers 1A and 1B are abutted against each other, the locking pieces 10 of one coupler 1A are brought into contact with the inclined surfaces 30 of the locking pieces 27 of the other coupler 1B. When the pair of couplers 1A and 1B are urged against each other in the abutting directions, the locking pieces 27 are retreated outwardly in the radial direction against the biasing force of the plate springs 28, and the locking projecting portions 12 of the locking pieces 10 pass by the locking pieces 27.

When the locking projecting portions 12 of the locking pieces 10 pass by the locking pieces 27, the locking pieces 27 are moved inwardly in the radial direction of the cylindrical bodies 1 by the biasing force of the plate springs 28, and the locking portions 29 of the locking pieces 27 are locked by the side surfaces 12a of the locking projecting portions 12 of the locking pieces 10. Then, the end faces of the proximal end portions 2 of the pair of cylindrical bodies 1 are connected to each other through the packing members 32.

In this case, there is no stepped portion between the inner surfaces of the inner cylindrical portions 1a of the coupled cylindrical bodies 1, and these inner surfaces are coextensive. Thus, the flow resistance of water or the like flowing in the cylindrical bodies 1 can be decreased. In addition, since the packing members 32 have the lip portions 32a projecting inwardly obliquely in the radial direction of the cylindrical bodies 1, the lip portions 32a spread outwardly in the radial direction upon reception of the pressure of a fluid, e.g., water, flowing in the cylindrical bodies 1 and are thus brought into pressure contact with each other, thereby maintaining high sealing performance. Since the locking pieces 10 of the locking cylindrical bodies 7 cover almost the entire circumferential surfaces of the outer sides of the packing members 32, the packing members 32 will not pop up even upon application of a water hammer.

Therefore, the pair of cylindrical bodies 1 can be coupled to each other with a single operation of abutting the pair of couplers 1A and 1B having the above arrangement against each other and urging the couplers 1A and 1B against each other in the abutting directions, so that an operation of extending a fire hose by connecting a plurality of fire hoses can be performed quickly.

To disconnect the coupled couplers 1A and 1B from each other, the disengaging rings 14 of the couplers 1A and 1B are pushed simultaneously in directions towards each other, causing the disengaging pieces 13 to be moved forward, and the distal end faces of the disengaging pieces 13 are brought into contact with the inclined surfaces 30 of the corresponding locking pieces 27. When the disengaging pieces 13 are moved further forward, the locking pieces 27 are retreated outwardly against the biasing force of the plate springs 28, so that the locked state of the locking portions 29 of the locking pieces 27 and the locking projecting portions 12 of the locking pieces 10 is released. Thus, the pair of couplers 1A and 1B can be disconnected from each other by axially moving them apart.

In this case, of the disengaging rings 14 of the couplers 1A and 1B, even when only one disengaging ring 14 is pushed, the disengaging pieces 13 of one coupler 1A are moved forward so that merely the corresponding locking pieces 27 are retreated outward, and the locking portions 29 of the locking pieces 27 of the other coupler 1B are still locked with the locking projecting portions 12 of the corresponding locking pieces 10. Thus, the pair of couplers 1A and 1B cannot be disconnected from each other.

Therefore, even if one disengaging ring 14 is moved in the axial direction of its cylindrical body 1 upon reception of some external force, and the disengaging pieces 13 are moved forward, the pair of couplers 1A and 1B will not be accidentally disconnected from each other. In fire fighting of a building or the like, sometimes a fire fighter descends along a fire hose hanging from a window or a veranda. On this occasion, even if the fire fighter touches a disengaging ring 14 with his foot as he steps on the coupling apparatus to push the disengaging ring 14 in the disengagement direction, only the disengaging ring 14 of one coupler 1A or 1B is pushed in. Thus, the pair of couplers 1A and 1B will not be disconnected from each other, thereby improving safety.

Figure 7:
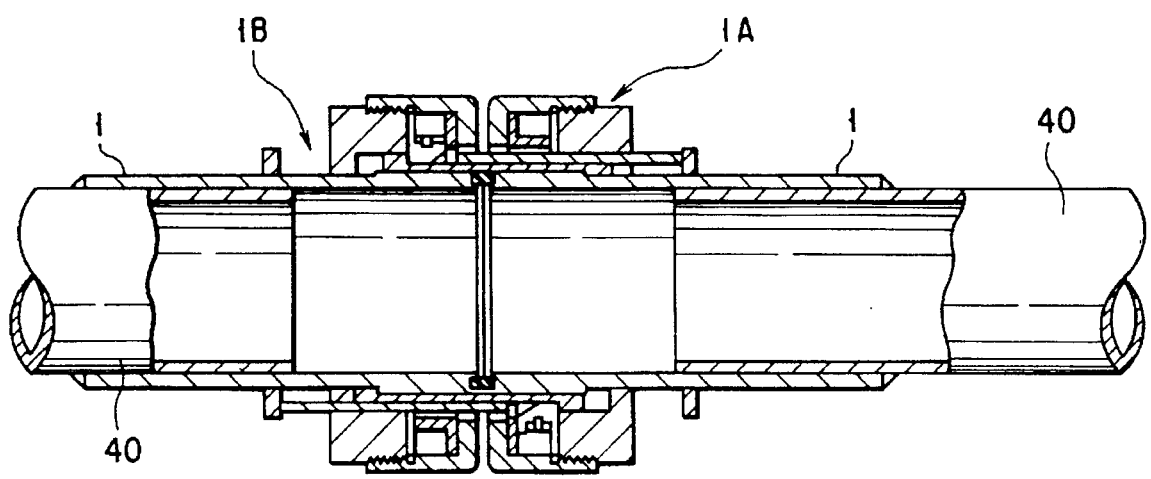
FIG. 7 is a longitudinal sectional view of coupling metal members according to the second embodiment of the present invention.

FIG. 7 shows the second embodiment of the present invention, in which a coupling apparatus is employed for coupling staging pipes used in the construction of a building or the like. The basic arrangement of a pair of couplers 1A and 1B constituting the coupling apparatus is the same as that of the first embodiment and is thus omitted. The end portions of pipes 40 for building a staging and having predetermined lengths are inserted in cylindrical bodies 1 of the couplers 1A and 1B, and the cylindrical bodies 1 and the corresponding pipes 40 are fixed by welding or with screws.

Accordingly, when a large number of staging assembly members obtained by fixing the couplers 1A and 1B at the two end portions of the pipes 40 are prepared and the couplers 1A and 1B are coupled as required, a staging can be assembled and dissembled easily, and can be transported and stored easily. The members to be coupled to the couplers 1A and 1B are not limited to pipes but can be solid rod-like bodies or square rods. In this embodiment, mechanisms for setting and releasing the locked state of the coupling apparatus can be provided inside the cylindrical bodies 1 instead of being provided outside the cylindrical bodies 1.

Figure 8:
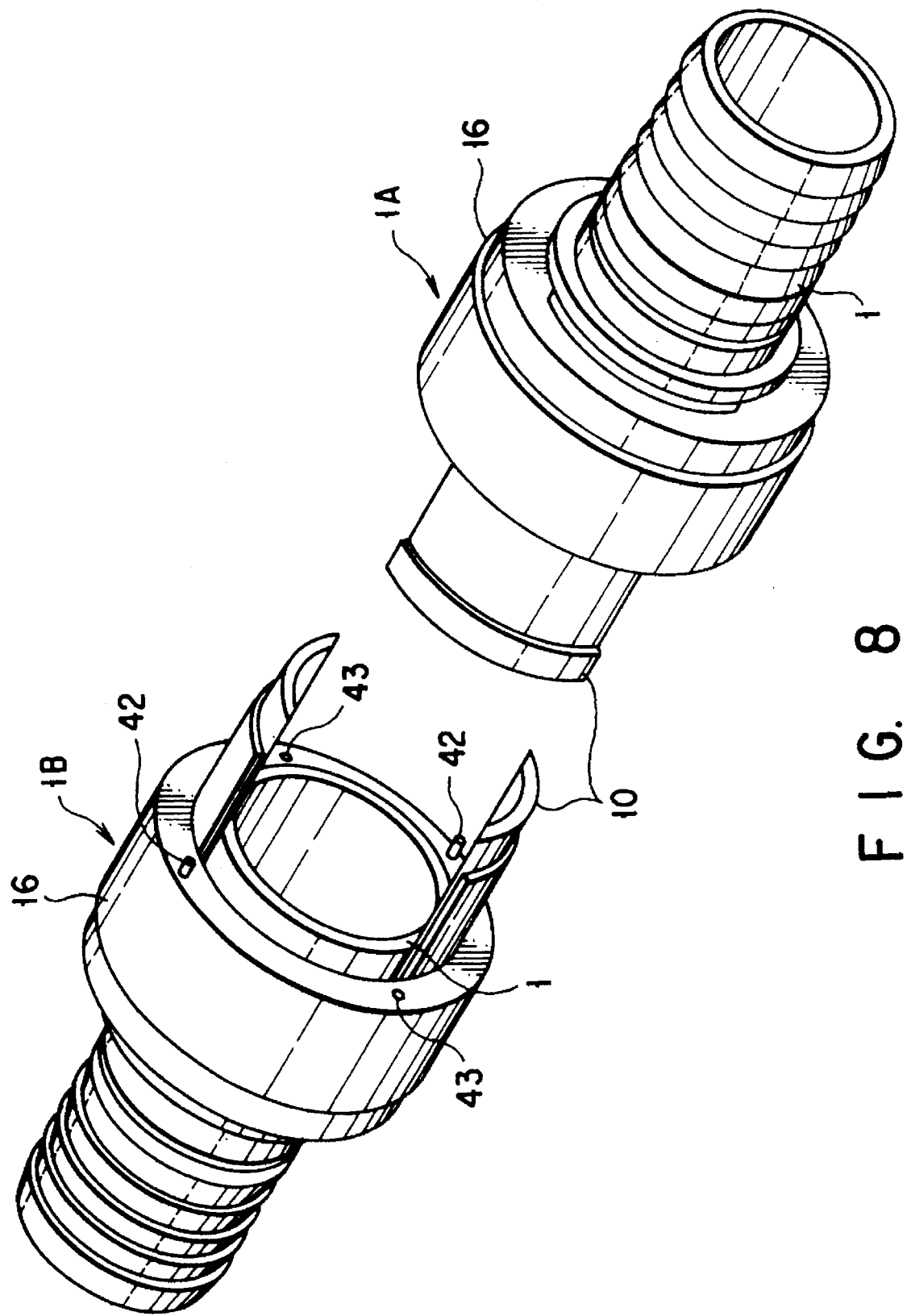
FIG. 8 is a perspective view of coupling metal members according to the third embodiment of the present invention.

FIG. 8 shows the third embodiment of the present invention, in which a coupling apparatus is used for coupling hoses incorporating communication wires. The basic arrangement of a pair of couplers 1A and 1B constituting the coupling apparatus is the same as that of the first embodiment and is thus omitted. Communication wire connection terminals, e.g., terminal pins 42, and holes 43 in which the terminal pins 42 can be inserted are provided to the end faces of cylindrical bodies 1 constituting the pair of couplers 1A and 1B.

In coupling the couplers 1A and 1B, the coupling position of the couplers 1A and 1B is predetermined. Since the couplers 1A and 1B are coupled by being axially pushed, when the couplers 1A and 1B are coupled, the terminal pins 42 are inserted in the holes 43 simultaneously, so that the couplers 1A and 1B are electrically connected to each other. In this case, for example, when the terminal pins 42 are determined as (−) and the holes 43 are determined as (+), the phases of the terminal pins 42 and the holes 43 can always be set to coincide with each other. Note that the communication wire connection terminals are not limited to terminal pins or terminal holes but can be projectable/retractable pins or connection pieces.

In the above embodiments, the locking members are fixed at the distal ends of the cylindrical main bodies such that they can project. An embodiment in which these locking members are axially movable with respect to the cylindrical bodies will be described. FIGS. 9 to 17 show the fourth embodiment of the present invention. This embodiment relates to a fire hose coupling apparatus in which handling and attachment/detachment are especially facilitated.

This coupling apparatus is constituted by a pair of couplers 101A and 101B having the same structure, shape, and size. In FIGS. 9 to 17, the identical portions of the couplers 101A and 101B are denoted by the same reference numerals.

Figure 9:
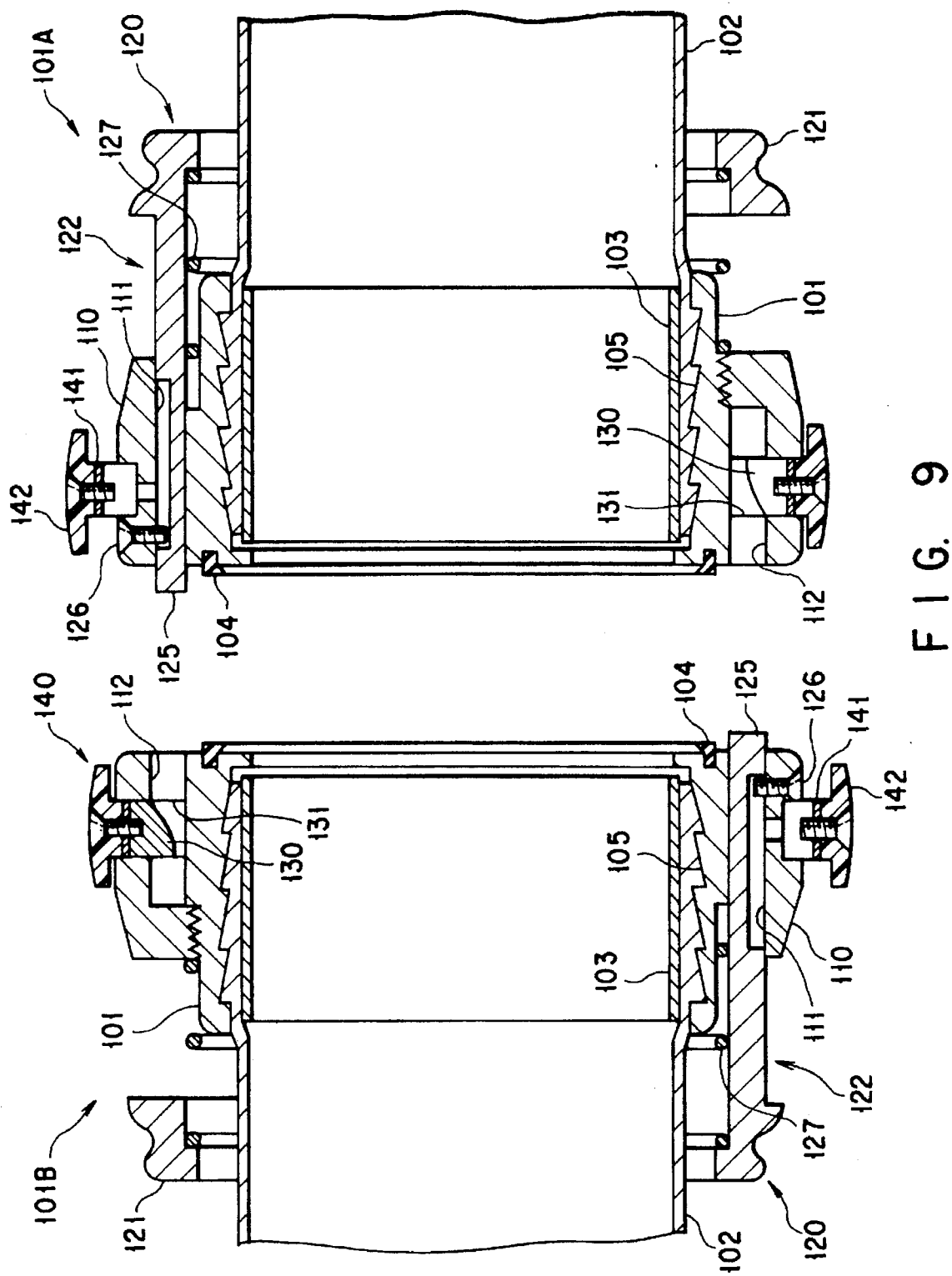
FIG. 9 is a longitudinal sectional view of coupling metal members in the disconnected state according to the fourth embodiment of the present invention.
Figure 10:
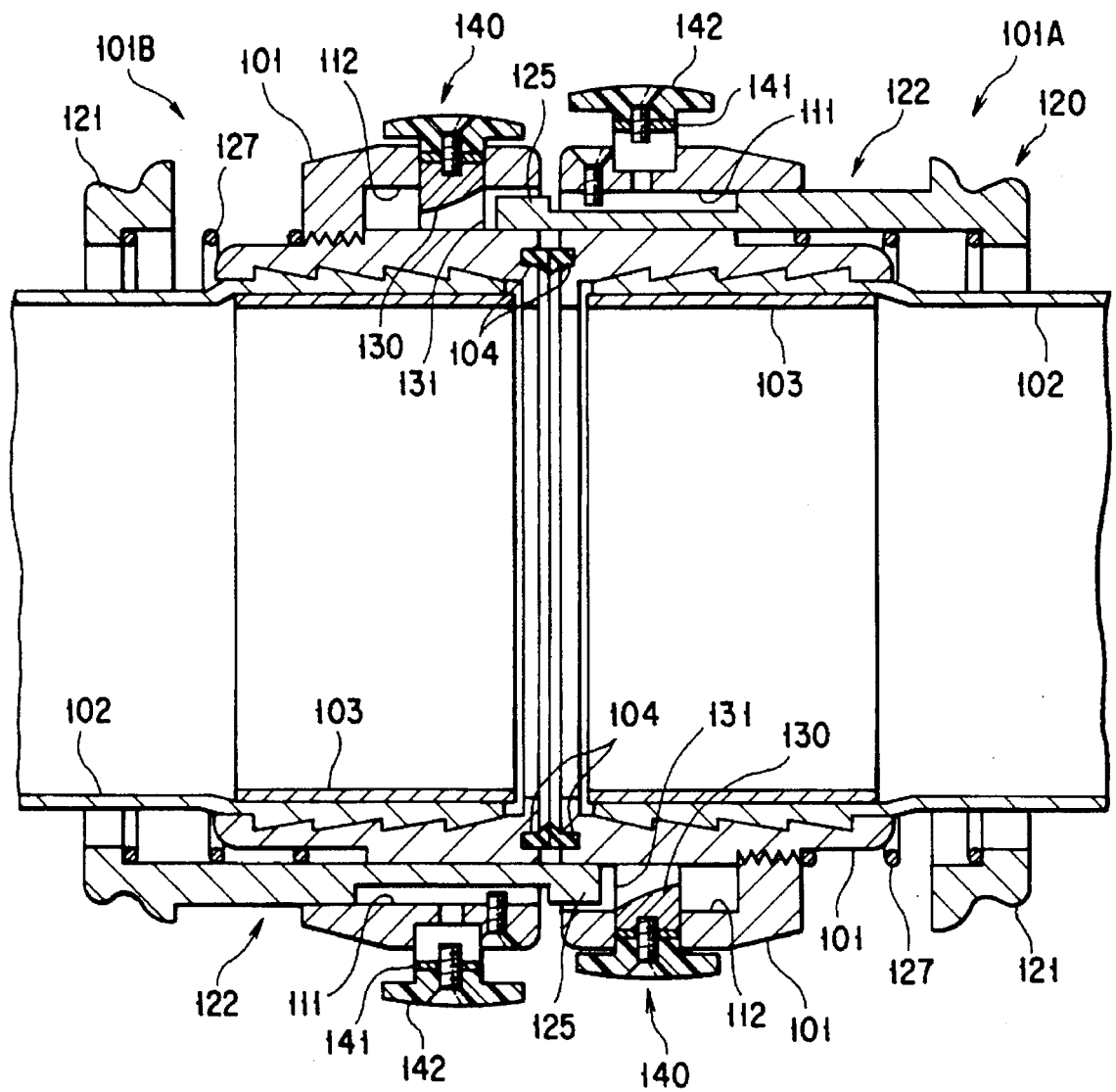
FIG. 10 is a longitudinal sectional view of the coupling metal members in a state during coupling according to the fourth embodiment of the present invention.
Figure 14:
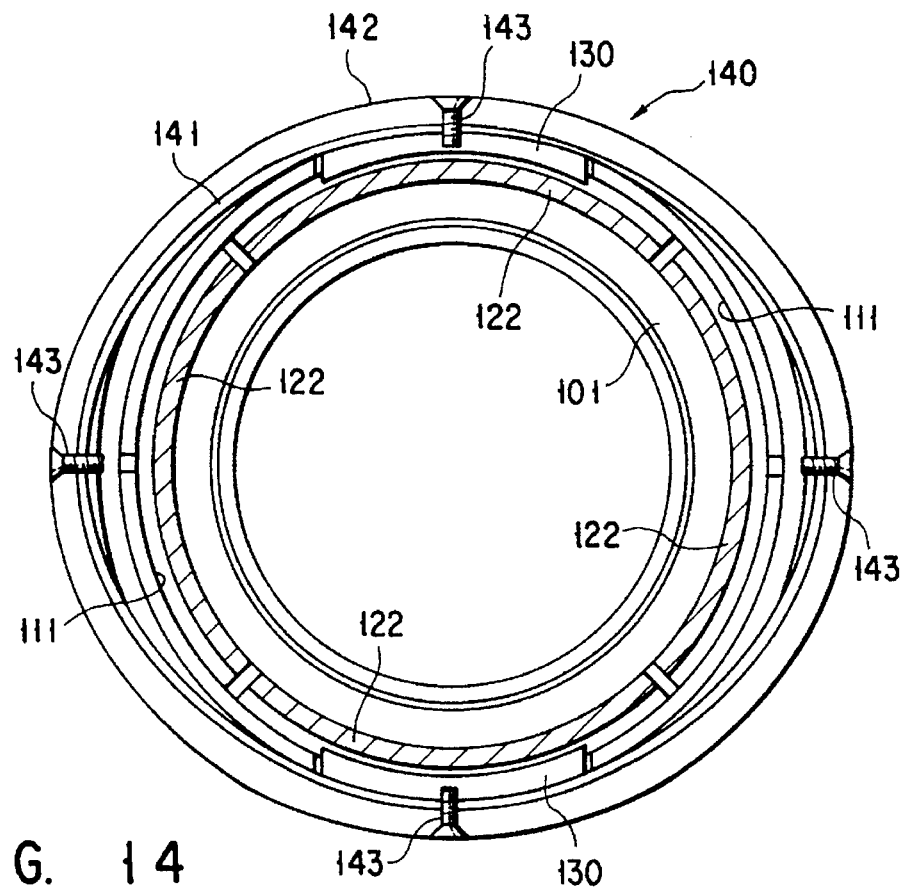
FIG. 14 is a sectional view taken along the line 14—14 of FIG. 11.

FIG. 9 is a longitudinal sectional view showing a disconnected state, FIG. 10 is a longitudinal sectional view showing a state during coupling, and FIG. 11 is a longitudinal sectional view showing a coupled state. FIGS. 9 to 11 are longitudinal sectional views taken along the lines, e.g., the line 9—9, of FIG. 13.

The entire portions of these couplers 101A and 101B are made of an aluminum alloy or other materials. Each coupler has a cylindrical body 101, and a plurality of projecting ridge portions 105 having a saw-tooth section are formed on the inner circumferential surface of the cylindrical body 101. A fire hose 102 is inserted inside each cylindrical body 101, and a stop ring 103 is fitted under pressure on the inner circumferential surface of the fire hose 102. The fire hose 102 is sandwiched under pressure between the stop ring 103 and the projecting ridge portions 105 on the inner circumferential surface of the cylindrical body 101 and connected to the cylindrical body 101 to maintain water tightness. Note that the fire hoses 102, the stop rings 103, and the openings at the distal end portions of the cylindrical bodies 101 are set to have the substantially same inner diameter. Thus, when the couplers 101A and 101B are coupled to each other as will be described below, the fire hoses 102 and the couplers 101A and 101B are connected smoothly not to form stepped portions or the like between the fire hoses 102 and the inner surfaces of the couplers 101A and 101B, so that no resistance is applied to water flowing through the fire hoses 102 and the couplers 101A and 101B.

The cylindrical bodies 101 are connected to each other as their distal end faces are concentrically abutted against each other. An annular packing member 104 is mounted on the distal end face of each cylindrical body 101. These packing members 104 are made of an elastic material, e.g., hard synthetic rubber, and form the shape of lips. Accordingly, these packing members 104 are abutted against each other to maintain water tightness. Also, the lip-shaped packing members 104 are deformed by a water pressure to urge against each other, thereby maintaining water tightness more reliably.

A protection cylinder 110 is mounted on the outer circumferential surface of each cylindrical body 101. The distal end portion of each protection cylinder 110 is mounted on the outer circumferential surface of the corresponding cylindrical body 101 to threadably engage with it. A pair of locking piece guide holes 111 are formed in each protection cylinder 110. These locking piece guide holes 111 are formed between arcuated grooves, formed in the inner circumferential surface of the protection cylinder 110, and the outer circumferential surface of the corresponding cylindrical body 101. The locking piece guide holes 111 are formed to axially extend through the entire length of the corresponding protection cylinder 110. Each of the pair of locking piece guide holes 111 is formed to extend in a range slightly narrower than 90° in the circumferential direction. The pair of locking piece guide holes 111 are arranged symmetrical to be separated from each other by 180° in the circumferential direction.

A pair of locking piece insertion holes 112 are formed in the inner circumferential surface of each protection cylinder 110. Similar to the locking piece guide holes 111, these locking piece insertion holes 112 are arcuated holes formed between the grooves formed in the inner circumferential surface of the corresponding protection cylinder 110 and the outer circumferential surface of this protection cylinder 110. Each locking piece insertion hole 112 is formed to extend in a range slightly narrower than 90° in the circumferential direction. The locking piece insertion holes 112 are arranged symmetrically to be separated from each other by 180°, and are formed to be separated from the locking piece guide holes 111 by 90°. Different from the locking piece guide holes 111, the locking piece insertion holes 112 are formed to axially extend only from the distal end face of the corresponding protection cylinder 110 by a predetermined length and do not extend through the entire length of the corresponding protection cylinder 110. To couple the couplers 101A and 101B to each other, one coupler 101A and the other coupler 101B are abutted against each other such that their locking piece guide holes 111 and locking piece insertion holes 112 are separated from each other by 90° in the circumferential direction. Thus, the locking piece guide holes 111 of one coupler 101A and the locking piece insertion holes 112 of the other coupler 101B oppose each other.

Locking members 120 are fitted on the outer circumferential surface of each cylindrical body 101 to be axially movable. FIG. 12 shows only the locking members 120 of the two couplers 101A and 101B. Each pair of locking members 120 have a common annular portion 121 at their proximal end portions, and a pair of locking pieces 122 integrally project from the annular portion 121 toward the distal end portion of the corresponding coupler. Each locking piece 122 has an arcuated section and is formed to extend in a range slightly narrower than 90° in the circumferential direction. Each pair of locking pieces 122 are arranged symmetrically to be separated from each other by 180° in the circumferential direction. Each locking piece 122 has a thick-walled portion 123 and a thin-walled portion 124 at its proximal and distal end portions, respectively, and a locking projecting portion 125 contiguous in the circumferential direction is formed at the distal end portion of the thin-walled portion 124. Notched portions 128 are formed between the locking pieces 122.

The inner circumferential surfaces of the locking members 120 are slidably fitted on the outer circumferential surface of the corresponding cylindrical body 101, and their locking pieces 122 are slidably inserted in the pair of locking piece guide holes 111 of the corresponding protection cylinder 110. Accordingly, these locking members 120 are guided by the outer circumferential surface of the corresponding cylindrical body 101 and the locking piece guide holes 111 of the corresponding protection cylinder 110 to be slidable in the axial direction of the corresponding cylindrical body 101. An elastic member, e.g., a coil spring 127, is interposed between the annular portion 121 of the locking member 120 and the corresponding cylindrical body 101. The locking members 120 are biased by the spring 127 in a direction to move backward. Accordingly, as shown in FIG. 9, when the couplers 101A and 101B are not coupled to each other, the locking pieces 122 of their locking members 120 do not project from the distal end faces of the cylindrical bodies 101, and are accommodated in the locking piece guide holes 111 of the corresponding protection cylinders 110. Reference numerals 126 denote set screws 126 for preventing removal of the locking members 120. The retreat positions of the locking members 120 are regulated by the set screws 126. In this embodiment, when the locking members 120 are at their retreat positions, the distal end portions of their locking pieces 122 slightly project from the distal end faces of the corresponding cylindrical bodies 101.

Locking piece accommodating holes 131 are radially formed in each protection cylinder 110 at positions corresponding to the locking piece insertion holes 112, and to-be-locked members, e.g., arcuated locking pieces 130, are accommodated in the locking piece accommodating holes 131 to be axially slidable. These locking pieces 130 have inclined inner circumferential surfaces, and these inner circumferential surface portions project into the corresponding locking piece insertion holes 112. Note that the locking pieces 130 are formed to have a width smaller than that of the locking pieces 122.

When the couplers 101A and 101B are to be coupled to each other, they are rotated in the circumferential direction by 90°, and their cylindrical bodies 101 are abutted against each other. Therefore, the locking piece guide holes 111 of the protection cylinders 110 oppose the locking piece insertion holes 112 of the opposite protection cylinders 110. In this state, the locking members 120 are axially moved forward against the biasing force of the springs 127. Then, as shown in FIG. 10, the locking pieces 122 project and are inserted and fitted in the locking piece insertion holes 112 of the opposite protection cylinders 110. When the distal end portions of the locking pieces 122 are brought into contact with the inclined surface portions of the locking pieces 130 to move the locking pieces 130 outwardly in the radial direction and the locking projecting portions 125 at the distal end portions of the locking pieces 122 move over the locking pieces 130, the locking pieces 130 are radially moved inwardly and are engaged with the locking projecting portions 125 of the locking pieces 122, as shown in FIG. 11, thereby coupling the couplers 101A and 101B.

Figure 15:
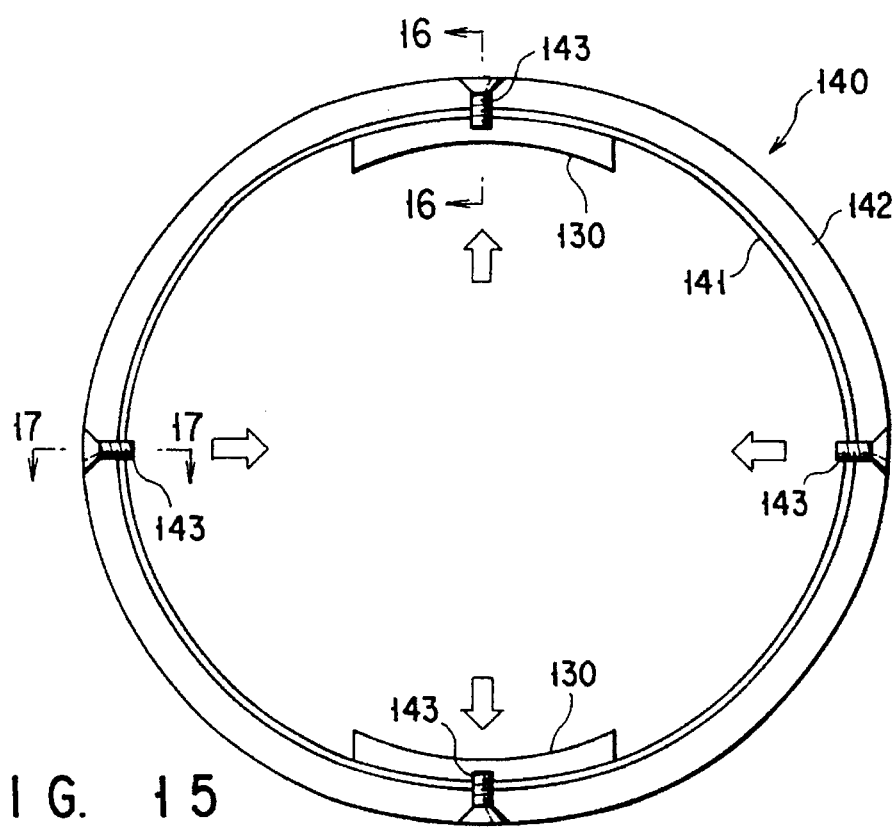
FIG. 15 is a front view of disengaging mechanisms of the fourth embodiment of the present invention.
Figure 16:
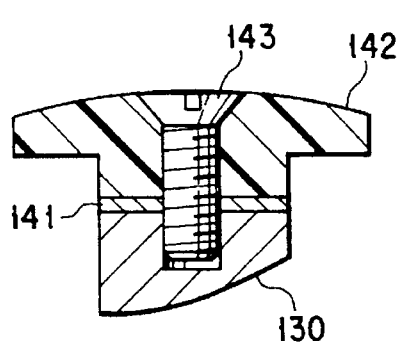
FIG. 16 is a sectional view taken along the line 16—16 of FIG. 15.
Figure 17:
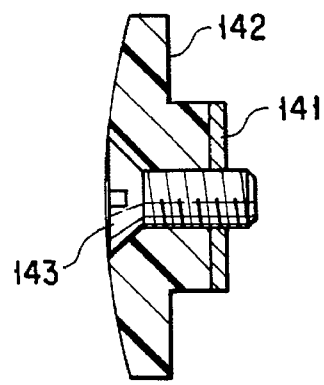
FIG. 17 is a sectional view taken along the line 17—17 of FIG. 15.
Figure 18:
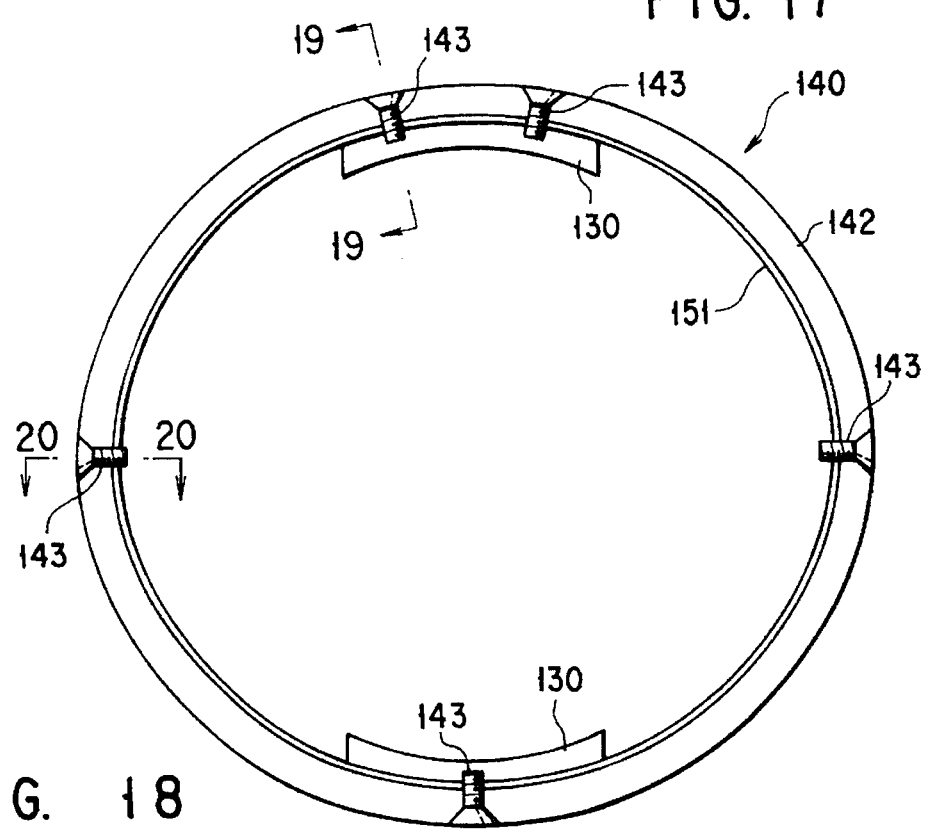
FIG. 18 is a front view of disengaging mechanisms according to the fifth embodiment of the present invention.

Disengaging mechanisms 140 for radially biasing the locking pieces 130 inwardly and disengaging the locking projecting portions 125 of the locking pieces 122 and the locking pieces 130 from each other will be described. Each disengaging mechanism 140 has an elastic ring 141 as shown in FIG. 15. The elastic ring 141 is obtained by forming a plate spring member into a substantially elliptic ring. A grip ring 142 made of a flexible material, e.g., a synthetic resin or a synthetic rubber, and having a substantially T-shaped section is placed on the outer side of the elastic ring 141, and is coupled to the elastic ring 141 with a plurality of screws 143. The locking pieces 130 are mounted on the inner circumferential surface of the elastic ring 141 with the screws 143. These locking pieces 130 are arranged on the minor axis of the elliptic elastic ring 141.

The locking pieces 130 are biased inwardly in the radial direction by the elastic force of the elastic ring 141. Hence, as described above, the locking pieces 130 are engaged with the locking projecting portions 125 of the locking pieces 122 inserted in the locking piece insertion holes 112 with the biasing force of the elastic ring 141. To disengage the locking pieces 130, the elliptic elastic rings 141 are held by hands each at its two portions on the major axis, and the elastic rings 141 are deformed in a squeezing manner in the direction of the major axis. Then, the elastic rings 141 are deformed to be diameter-increased in the direction of their minor axis, and the locking pieces 130 mounted on portions of the elastic rings 141 on the minor axis are moved outwardly in the radial direction, thereby disengaging the locking pieces 122 from the locking projecting portions 125.

In this embodiment, as described above, when the couplers 101A and 101B are not coupled to each other, the locking pieces 122 of the locking members 120 are retracted in the corresponding protection cylinders 110 and do not project from the end faces of the corresponding cylindrical body 101. Thus, the locking pieces 122 will not collide against something and be damaged, or will not be caught by something.

When the couplers 101A and 101B are to be coupled, their cylindrical bodies 101 are concentrically abutted against each other such that the locking pieces 122 of the cylindrical body are shifted from those of the opposite cylindrical body 101 by 90°, as shown in FIG. 12. Subsequently, in this state, the locking members 120 are moved forward against the biasing force of the springs 127, as shown in FIG. 10. The locking pieces 122 of the locking members 120 which have moved forward are fitted on the outer circumferential surfaces of the opposite cylindrical body 101, and are inserted and fitted in the locking piece insertion holes 112 of the opposite cylindrical body 101. When the locking pieces 122 are further moved forward, as shown in FIG. 11, the locking projecting portions 125 at the distal end portions of the locking pieces 122 are engaged with the opposite locking pieces 130, thereby coupling the couplers 101A and 101B.

In this case, since the locking pieces 122 are moved forward while being fitted on the outer circumferential surfaces of the opposite cylindrical bodies 101, the cylindrical bodies 101 are held in the concentric state by the locking pieces 122 that are moving forward, so that the coupling operation is facilitated. Since the locking pieces 122 of the locking members 120 have a shape to fit to each other, as shown in FIG. 12, when they are moved forward, they are fitted with the opposite locking pieces 122 to be shifted from each other by 90° in the circumferential direction, and are moved forward while maintaining this fitted state. Thus, the couplers 101A and 101B are held to have a predetermined relationship of rotational angles until the coupling operation ends, thereby further facilitating the coupling operation.

In this embodiment, even in the disconnected state, the distal end portions of the locking pieces 122 slightly project from the distal end faces of the corresponding cylindrical bodies 101. Thus, while the couplers 101A and 101B that are in this disconnected state are abutted against each other first, the distal end portions of the projecting locking pieces 122 are fitted with the opposite cylindrical bodies 101 and with the opposite locking pieces 122 as well. In this state, the cylindrical bodies 101 are already fitted to each other concentrically while they are positioned at a predetermined rotational angle, and this state is maintained. Therefore, only the locking members 120 need be moved forward after this, further facilitating the coupling operation.

In this embodiment, each cylindrical body 101 has the pair of locking pieces 122, and the locking pieces 122 are fitted with the opposite locking pieces 122 to be shifted from them by 90°. Generally, man recognize a space with reference to vertical and horizontal orthogonal axes. Thus, it is easy to align a pair of engaging pieces that are fitted with an opposite pair of engaging pieces to be shifted from them by 90°, i.e., to be orthogonal. This embodiment is thus suitable for a coupling apparatus, e.g., one for fire hoses, which must perform coupling quickly under bad conditions.

To disconnect these couplers, the elastic rings 141 of the disengaging mechanism 140 are held by the hand each at its two portions on the major axis, and the elliptic elastic rings 141 are depressed in the squeezing manner in the direction of the major axis. Thus, the locking pieces 130 are moved outwardly in the radial direction, as described above, to disengage them from the locking projecting portion 125, so that the couplers 101A and 101B are disconnected from each other.

These disengaging mechanisms 140 have a simple structure and their disengaging operation is easy. Since the elastic rings 141 and the grip rings 142 have annular shapes, they will not likely be caught by something when the hose is dragged. As the hoses will not be disengaged unless the elastic rings 141 are depressed each at its two portions on the major axis simultaneously. Even if the elastic rings 141 are depressed by something, they will not be undesirably disengaged, leading to a high reliability.

Figure 19:
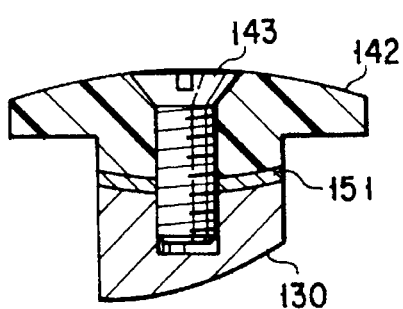
FIG. 19 is a sectional view taken along the line 19—19 of FIG. 18.
Figure 20:
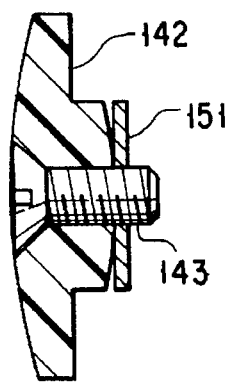
FIG. 20 is a sectional view taken along the line 20—20 of FIG. 18.
Figure 21:
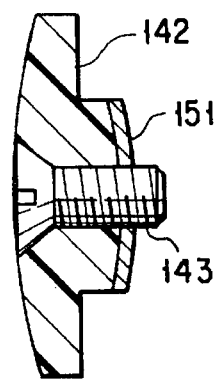
FIG. 21 is a sectional view of another state taken along the line 20—20 of FIG. 18.

FIGS. 18 to 21 show disengaging mechanisms 140 according to the fifth embodiment of the present invention. Each disengaging mechanism 140 has substantially the same arrangement as that of the fourth embodiment, except that its elastic ring 151 is made of a leaf spring which has an arcuated section in the initial state, as shown in FIGS. 19 and 21. The elastic ring 151 is obtained by forming a linear leaf spring member to have an elliptic shape and fixing the two end portions of the leaf spring member with two screws at its one locking piece 130 portion. The inner circumferential surface of a grip ring 142 identical to that described above and the outer circumferential surfaces of the locking pieces 130 identical to those of the above embodiment also have an arcuated section to correspond to the section of this leaf spring member. At the locking piece 130 portions, the leaf spring member is sandwiched under pressure between the grip ring 142 and the locking pieces 130, so that the leaf spring member is always maintained to have an arcuated section. Since the leaf spring member is elliptic, it causes buckling at the two portions on the major axis of the elliptic elastic ring 151, and is thus deformed to have a flat section, as shown in FIG. 20.

The operation and the like of the disengaging mechanism 140 of the fifth embodiment described above are substantially the same as those of the disengaging mechanism of the fourth embodiment. However, when the disengaging mechanism 140 of the fifth embodiment is set in the disengaged state by depressing the elastic ring 151 at its two portions on the major axis, the elliptic elastic ring 151 is deformed into a substantial circle. Thus, the two portions on the major axis of the elastic ring 151 cause buckling again, so that the elastic ring 151 is deformed to have an arcuated section, as shown in FIG. 21. This buckling provides a nodal response by disengagement upon depressing the elastic ring 151 at its two portions, thereby improving the operability.

FIGS. 22 to 27 show disengaging mechanisms 140 according to the sixth embodiment of the present invention. Each disengaging mechanism 140 has a movable ring 161 which is mounted to the outer circumferential surface of a protection cylinder 110 identical to that described above to be axially movable. As shown in FIG. 23, the movable ring 161 is biased by a spring 162 to be axially movable backward. The retreat position of the movable ring 161 is regulated by a set screw 165. Locking pieces 130 identical to those described above are held in the protection cylinder 110 to be movable in the radial direction.

Permanent magnets 163 are buried in each locking piece 130, and other permanent magnets 163 are buried in portions of the movable ring 161 corresponding to the locking pieces 130 as well. These permanent magnets 163 have the shape of an elongated arc and are arranged such that their elongated direction coincides with the circumferential direction. The permanent magnets 163 in each locking piece 130 are axially arranged in, e.g., two rows, and the permanent magnets 163 in the movable ring 161 are axially arranged in, e.g., three rows. As shown in FIGS. 24 and 25, these permanent magnets 163 are arranged such that their N and S poles are opposite alternately. Solid portions in the drawings indicate N poles, and hollow portions in the drawings indicate S poles.

In the disengaging mechanism 140 of this embodiment, the movable ring 161 is positioned at the retreat position, as shown in FIGS. 22 and 23, by the elastic force of the spring 162. In this state, the permanent magnets 163 of the first and second rows counted from the distal end side of the movable ring 161 correspond to the permanent magnets 163 of the two rows of each locking piece 130. In this case, the N and S poles of the permanent magnets 163 of the locking pieces 130 correspond to the N and S poles of the permanent magnets 163 of the movable ring 161. These permanent magnets 163 repel each other, and the locking pieces 130 are biased inwardly in the radial direction by this repulsive force. Accordingly, when couplers 101A and 101B are coupled to each other in this state and locking pieces 122 are inserted, the locking pieces 130 are engaged with the locking pieces 122 by this magnetic repulsive biasing force.

To disengage these locking pieces, the movable ring 161 is moved forward against the biasing force of the spring 162, as shown in FIGS. 26 and 27. In this state, the permanent magnets 163 of the second and third rows counted from the distal end side of the movable ring 161 correspond to the permanent magnets 163 of the two rows of each locking piece 130, and the N and S poles of the permanent magnets 163 of the locking pieces 130 correspond to the S and N poles of the permanent magnets 163 of the movable ring 161. Thus, a magnetic attractive force is generated between these permanent magnets. The locking pieces 130 are moved outwardly in the radial direction by this attractive force, thereby disengaging the locking pieces 130 from the locking pieces 122.

In this embodiment, the magnetic repulsive and attractive forces of the permanent magnets are utilized as the biasing force for engaging the locking pieces 130 and as the biasing force for disengaging the locking pieces 130. Thus, the structure of the disengaging mechanisms 140 is simple and a failure caused by a fracture or the like of the spring does not occur, leading to a high reliability.

FIGS. 28 to 33 show disengaging mechanisms 140 according to the seventh embodiment of the present invention. Each disengaging mechanism 140 has a rotational ring 171 which is rotatably mounted on the outer circumferential surface of a protection cylinder 110. Projecting portions 176 are provided to project on the two portions of the inner circumferential surface of the rotational ring 171. These projecting portion 176 are fitted in recessed grooves 177 formed in the protection cylinder 110, and the rotational ring 171 is rotational by a length corresponding to the length of the recessed groove 177. Permanent magnets 172 are buried in each projecting portion 176 and in the two end portions of each recessed groove 177. The rotational ring 171 is biased by the repulsive and attractive forces of these permanent magnets 172 to rotate in one direction, e.g., clockwise, in FIGS. 28 and 32.

Permanent magnets 173 are buried in locking pieces 130 identical to those of the above embodiments and in portions of the rotational ring 171 corresponding to the positions of these locking pieces 130. These permanent magnets 173 have an elongated shape and are arranged such that their longitudinal direction is aligned with the axial direction. The permanent magnets 173 are arranged in a plurality of rows in the circumferential direction. In this embodiment, the permanent magnets 173 are arranged in five rows in each locking piece 130 and in six rows in the rotational ring 171, such that their N and S poles are opposite alternately.

Figure 28:
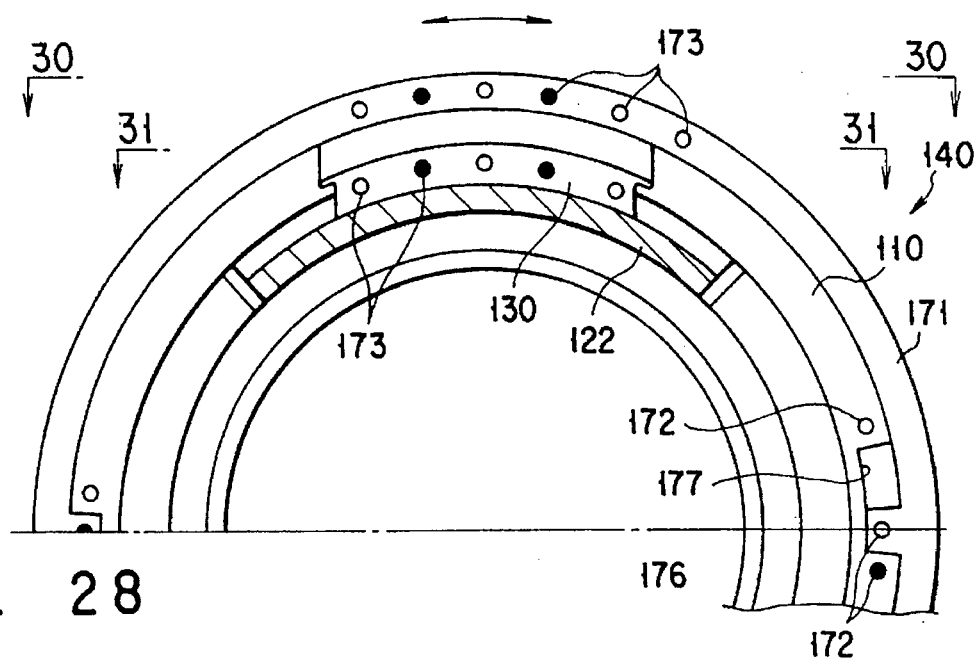
FIG. 28 is a cross-sectional view of disengaging mechanisms according to the seventh embodiment of the present invention.
Figure 29:
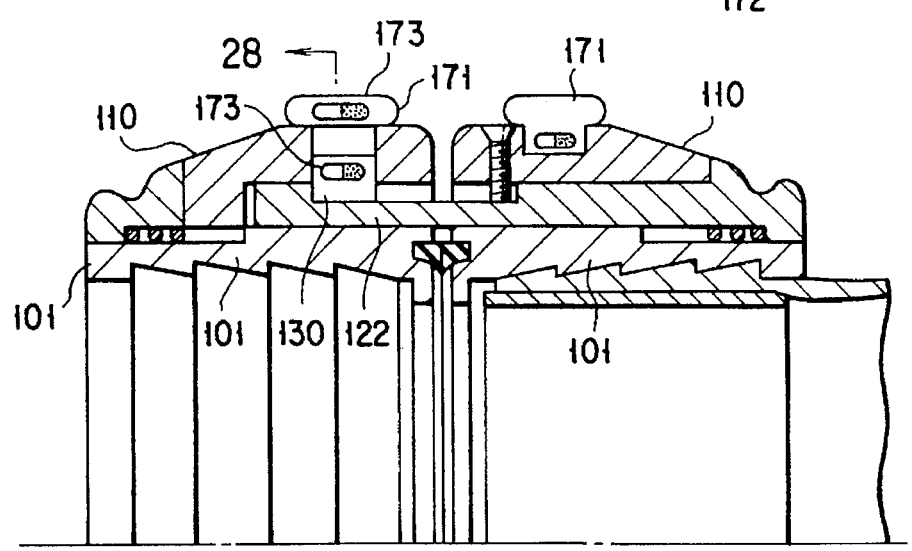
FIG. 29 is a longitudinal sectional view of the disengaging mechanisms according to the seventh embodiment of the present invention.
Figure 32:
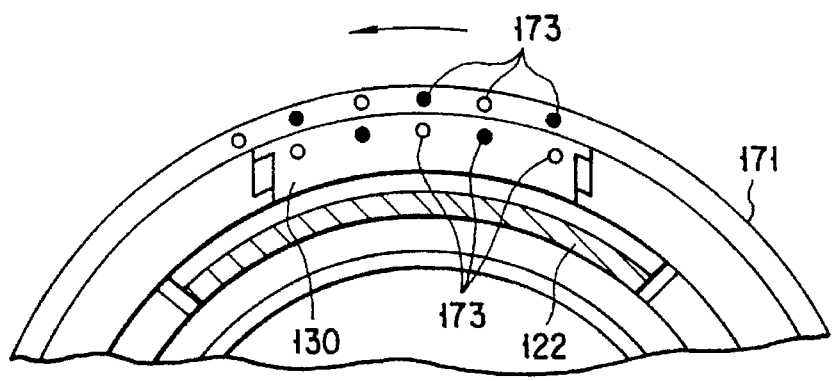
FIG. 32 is a cross-sectional view of another state of the disengaging mechanisms according to the seventh embodiment of the present invention.
Figure 33:
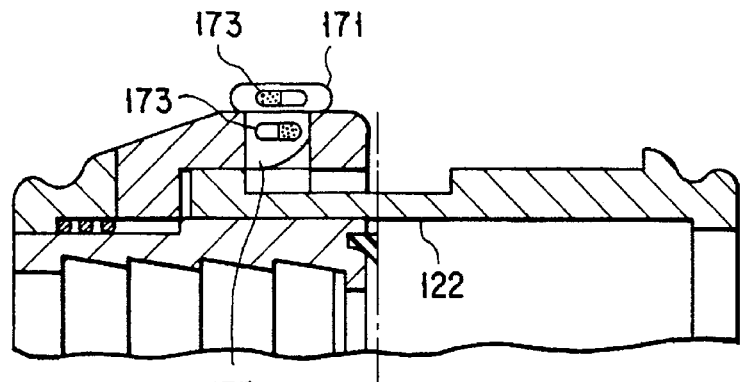
FIG. 33 is a longitudinal sectional view of this another state of the disengaging mechanisms according to the seventh embodiment of the present invention.

In this embodiment, in a normal state, the rotational ring 171 is rotated in one direction by the magnetic repulsive and attractive forces of the permanent magnets 172. In this state, as shown in FIGS. 28 and 29, the N and S poles of the permanent magnets 173 of the locking pieces 130 correspond to the N and S poles of the permanent magnets 173 of the rotational ring 171. The locking pieces 130 are biased inwardly in the radial direction by the repulsive force of the permanent magnets 173. During coupling, the locking pieces 130 are engaged with locking pieces 122 by this biasing force.

To disengage these locking pieces, the rotational ring 171 is rotated, e.g., counterclockwise, against the biasing force of the permanent magnets 172. Then, the N and S poles of the permanent magnets 173 of the rotational ring 171 correspond to the S and N poles of the permanent magnets 173 of the locking pieces 130. The locking pieces 130 are moved outwardly in the radial direction by the attractive force of the permanent magnets 173, so that the locking pieces 130 are disengaged from the locking pieces 122.

In this embodiment, since permanent magnets are used for biasing both the locking pieces 130 and the rotational ring 171, no spring need be used at all and accordingly a failure caused by fracture or the like of a spring does not occur, leading to a high reliability.

FIGS. 34 to 37 show disengaging mechanisms 140 according to the eighth embodiment of the present invention. Each disengaging mechanism 140 has an elastic ring 181 made of an elastic material, e.g., a synthetic resin material. The diameter of the elastic ring 181 can be elastically enlarged, and the elastic ring 181 is rotatably fitted on the outer circumferential surface of a protection cylinder 110 identical to those described above. Wedge-shaped inclined surface members 182 are mounted at two portions of the elastic ring 181, and recessed inclined surface portions 183 corresponding to these inclined surface members 182 are formed in the outer circumferential surface of the protection cylinder 110.

Locking pieces 130 identical to those described above are mounted to the inner circumferential surface of the elastic ring 181. These locking pieces 130 are biased inwardly in the radial direction by the elastic force of the elastic ring 181, so that they are engaged with locking pieces 122. A plurality of engaging projecting portions 186 circumferentially arranged at a predetermined interval are provided to project from the distal end portion of each locking piece 122. Notched portions 187 are formed in each locking piece 130 at a predetermined interval. The width and depth of these notched portions 187 are set to be larger than the width and height, respectively, of the engaging projecting portions 186.

Figure 34:
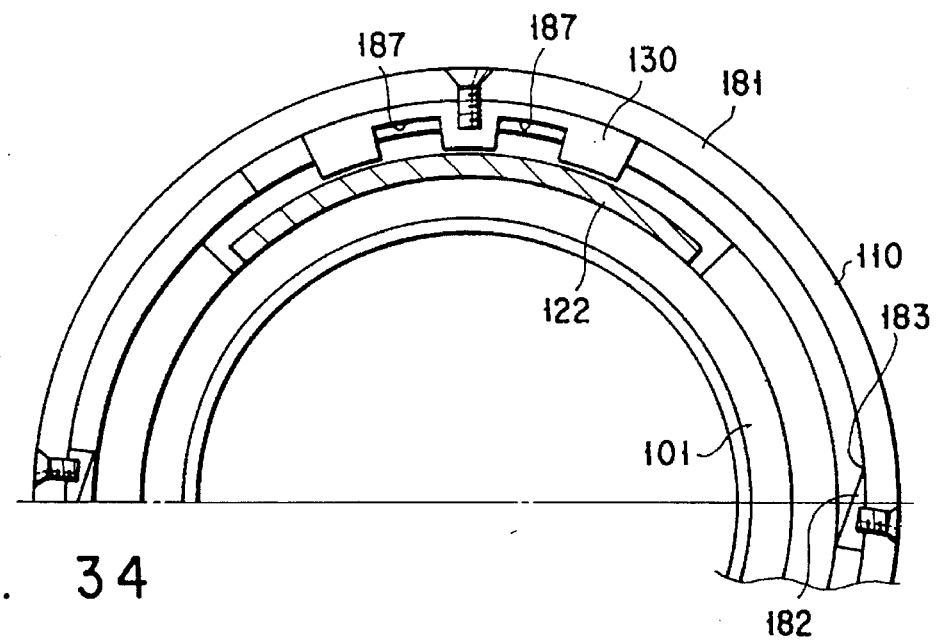
FIG. 34 is a cross-sectional view of disengaging mechanisms according to the eighth embodiment of the present invention.
Figure 35:
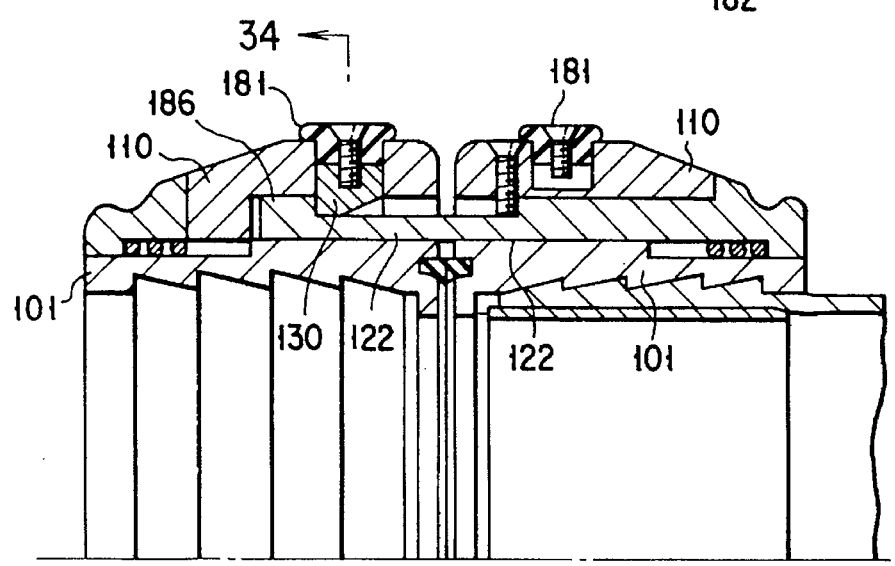
FIG. 35 is a longitudinal sectional view of the disengaging mechanisms according to the eighth embodiment of the present invention.

In this embodiment, usually, the inclined surface members 182 of the elastic ring 181 are slid down with respect to the inclined surface portions 183 due to the elastic force of the elastic ring 181, as shown in FIG. 34. In this state, the elastic ring 181 is substantially circular and its circumferential length is the shortest. In this state, the notched portions 187 of the locking pieces 130 do not correspond to the engaging projecting portions 186 of the locking pieces 122. Accordingly, the locking pieces 130 are engaged with the engaging protecting portions 186 by the elastic force of the elastic ring 181, as described above.

Figure 36:
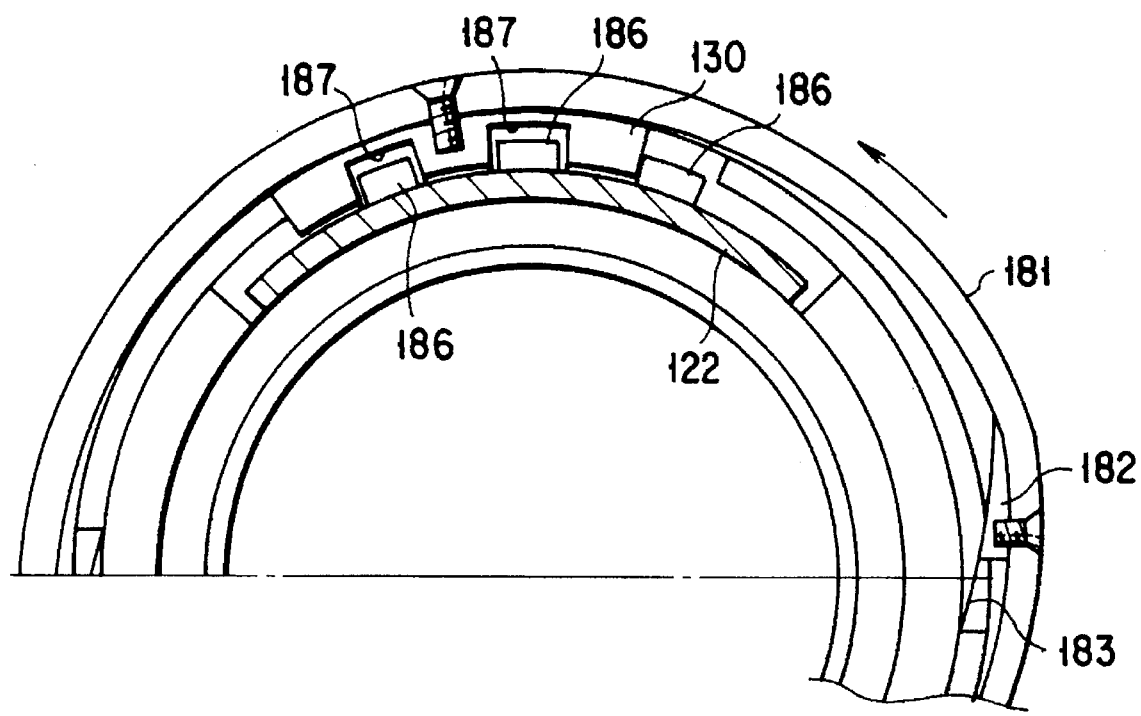
FIG. 36 is a cross-sectional view of another state of the disengaging mechanisms according to the eighth embodiment of the present invention.
Figure 37:
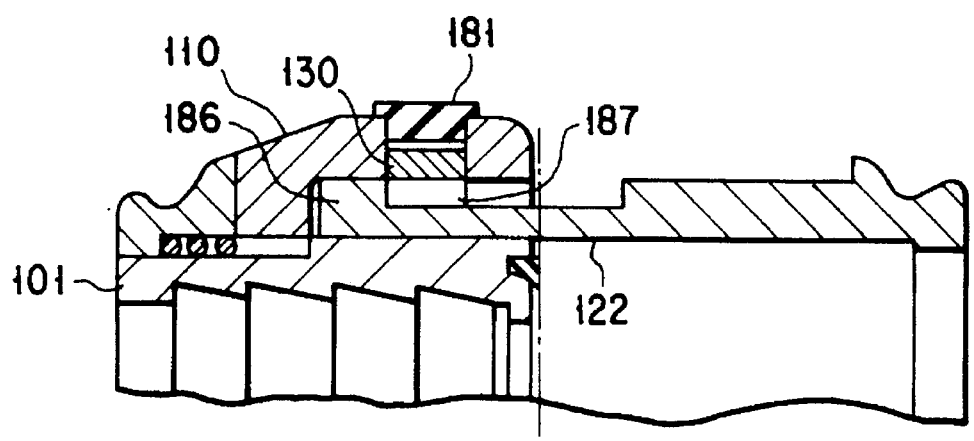
FIG. 37 is a longitudinal sectional view of this another state of the disengaging mechanisms according to the eighth embodiment of the present invention.
Figure 39:
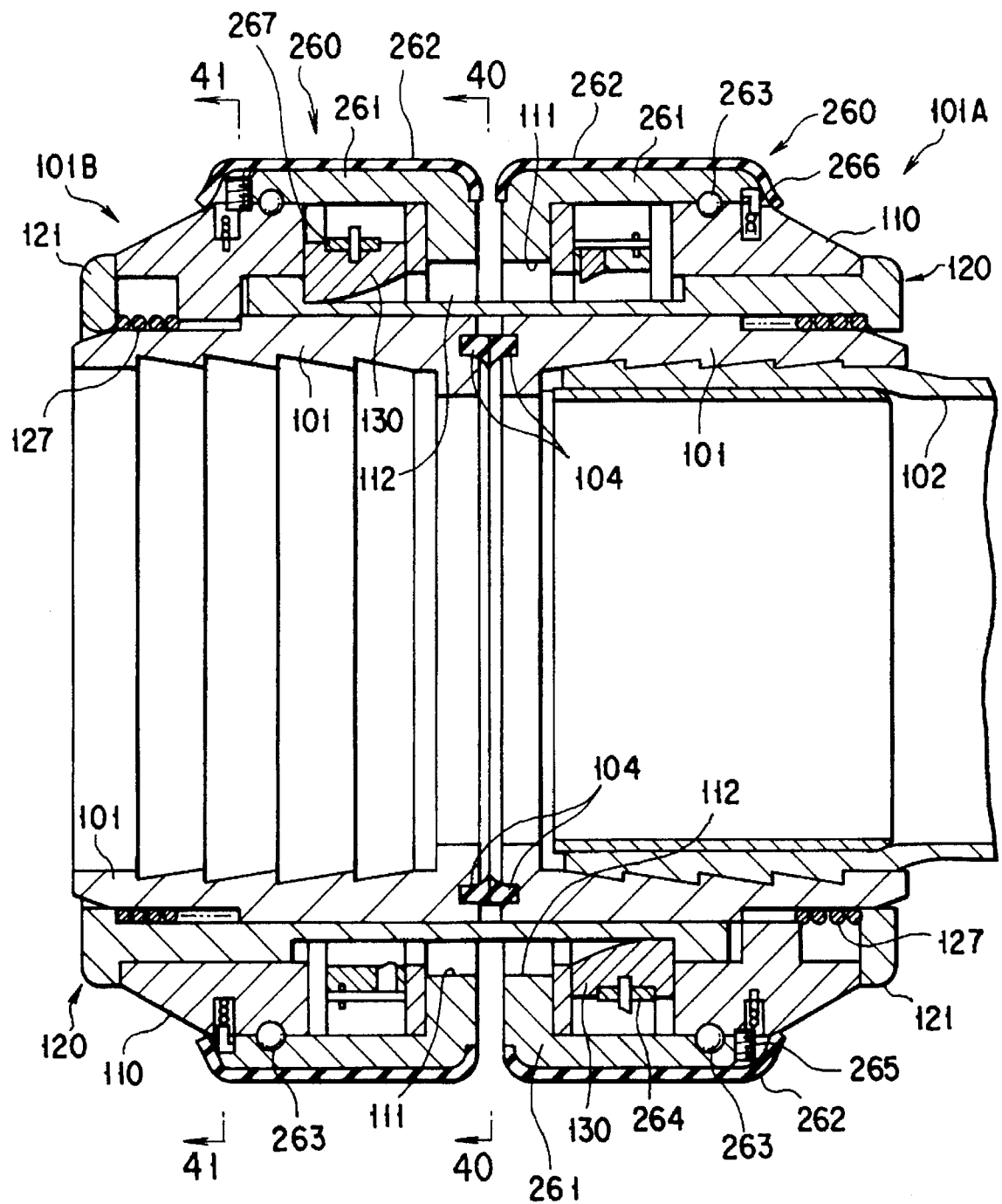
FIG. 39 is a longitudinal sectional view of the coupled state of the ninth embodiment of the present invention.

To disengage these locking pieces, the elastic ring 181 is rotated, e.g., counterclockwise, as shown in FIGS. 36 and 37. The locking pieces 130 are circumferentially moved with the rotational movement of the elastic ring 181. The notched portions 187 of the locking pieces 130 correspond to the engaging projecting portions 186 of the locking pieces 122, so that they are disengaged from each other. Upon the rotational movement of the elastic ring 181, the inclined surface members 182 ride on the inclined surface portions 183, and the inclined surface members 182 are moved outwardly in the radial direction. In this case, the circumferential length of the elastic ring 181 is increased, so that the elastic ring 181 is stretched. When the operator releases the elastic ring 181 in this state, the inclined surface members 182 are moved inwardly in the radial and axial directions by the elastic force of the elastic ring 181 such that they slide down along the inclined surface portions 183, and the elastic ring 181 is rotated clockwise and is thus restored to the initial state shown in FIGS. 34 and 35.

Figure 41:
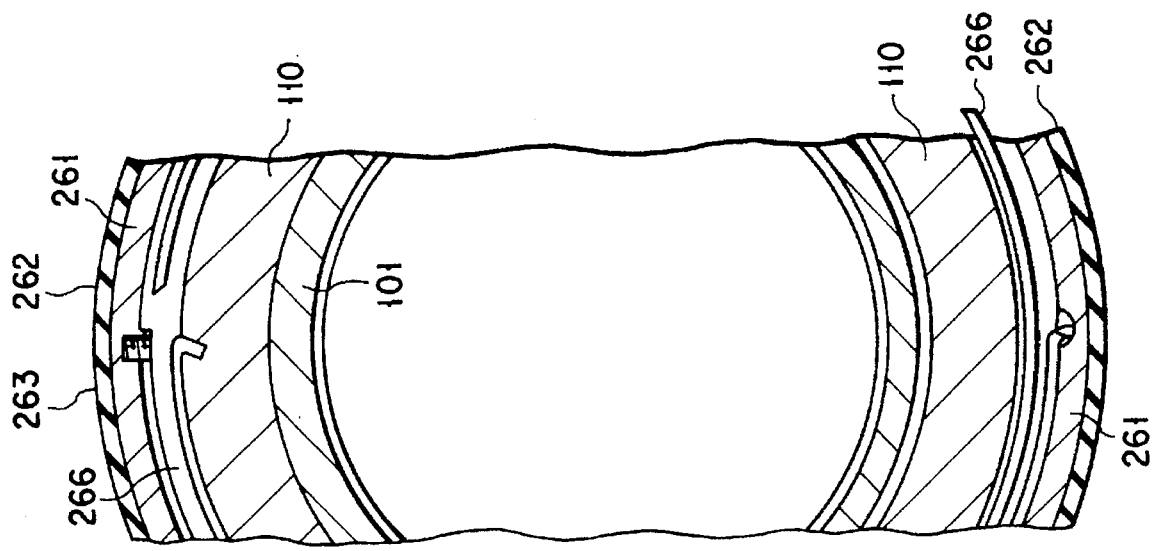
FIG. 41 is a sectional view taken along the line 41—41 of FIG. 39.
Figure 40:
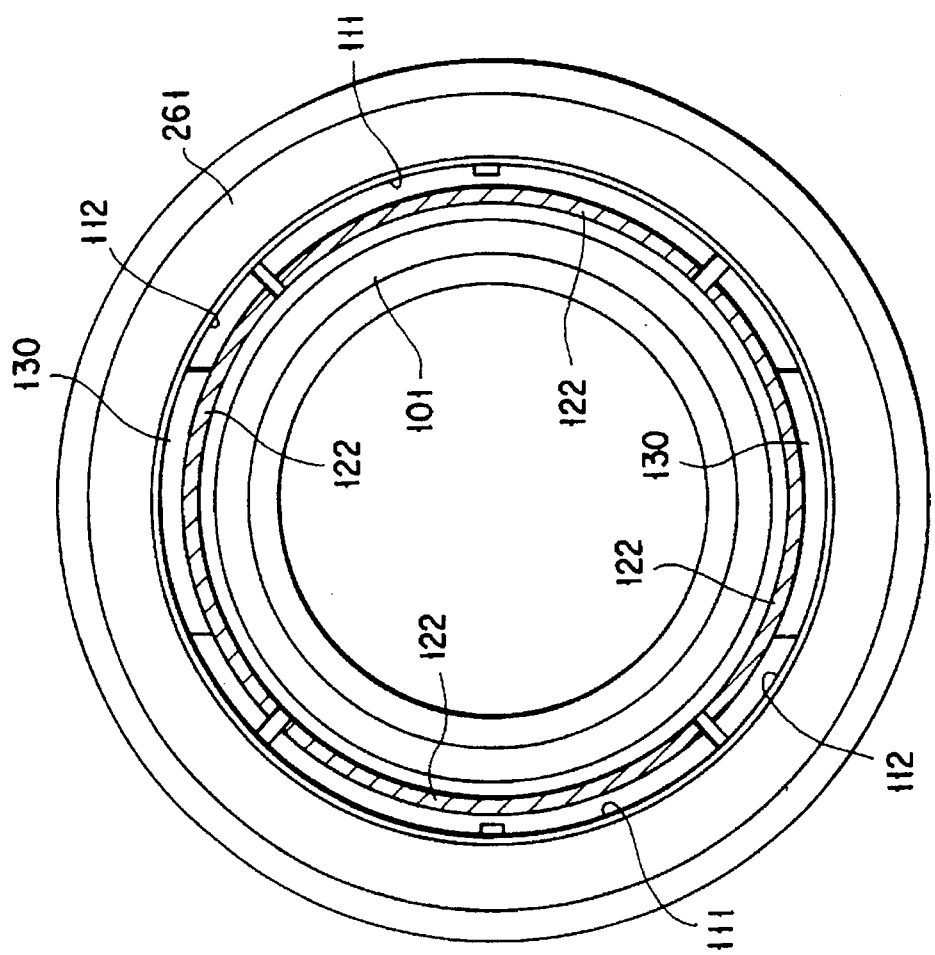
FIG. 40 is a sectional view taken along the line 40—40 of FIG. 39.

FIGS. 38 and 41 show the ninth embodiment of the present invention. This embodiment has substantially the same arrangement as that of the fourth embodiment, expect for the arrangement of its disengaging mechanisms 260 which bias locking pieces 130 and disengage the locking pieces 130. More specifically, in this embodiment, an annular rotational member 261 is rotatably mounted on the outer circumferential surface of each protection cylinder 110. This rotational member 261 is guided by a plurality of balls 263 and can be rotated with a small resistance. The locking pieces 130 identical to those described above are held by the rotational member 261, and are moved in the circumferential direction as the rotational member 261 is rotated. These locking pieces 130 are biased inwardly in the radial direction by leaf springs 264 and are engaged with locking projecting portions 125 of inserted locking pieces 122. A grip cover 262 made of a material, e.g., synthetic rubber, and forming a slippage preventive member is mounted on the outer circumferential surface of the rotational member 261.

A spiral spring 266 obtained by forming a piano wire into a spiral shape is interposed between the rotational member 261 and the protection cylinder 110. The rotational member 261 is biased, e.g., clockwise in FIG. 41, by the power spring 266. The rotational stop position of the rotational member 261 is regulated by stop screws 263. When the rotational member 261 is located at its stop position, the locking pieces 130 correspond to locking piece insertion holes 112 and can be engaged with the locking projecting portions 125 of the locking pieces 122 to be inserted.

In this embodiment, when the rotational member 261 is rotated through, e.g., almost 90°, against the biasing force of the power spring 266, the locking pieces 130 are moved in the circumferential direction together with the rotational member 261, thereby disengaging the locking pieces 130 from the locking projecting portions 125 of the locking pieces 122. In this embodiment, since the rotational member 261 of each disengaging mechanism 260 is annular in the same manner as in the fourth embodiment, even when the fire hose is dragged, the rotational member 261 will not likely be caught by something. Also, since they will not be disengaged unless the rotational member 261 is rotated, even when the rotational member 261 is brought into contact with something, they will not be undesirably disengaged from each other.

This embodiment has a similar arrangement to that of the fourth embodiment described above except for the above respects. Portions identical to those of the fourth embodiment are denoted by the same reference numerals, and a description thereof will be omitted.

Figure 42:
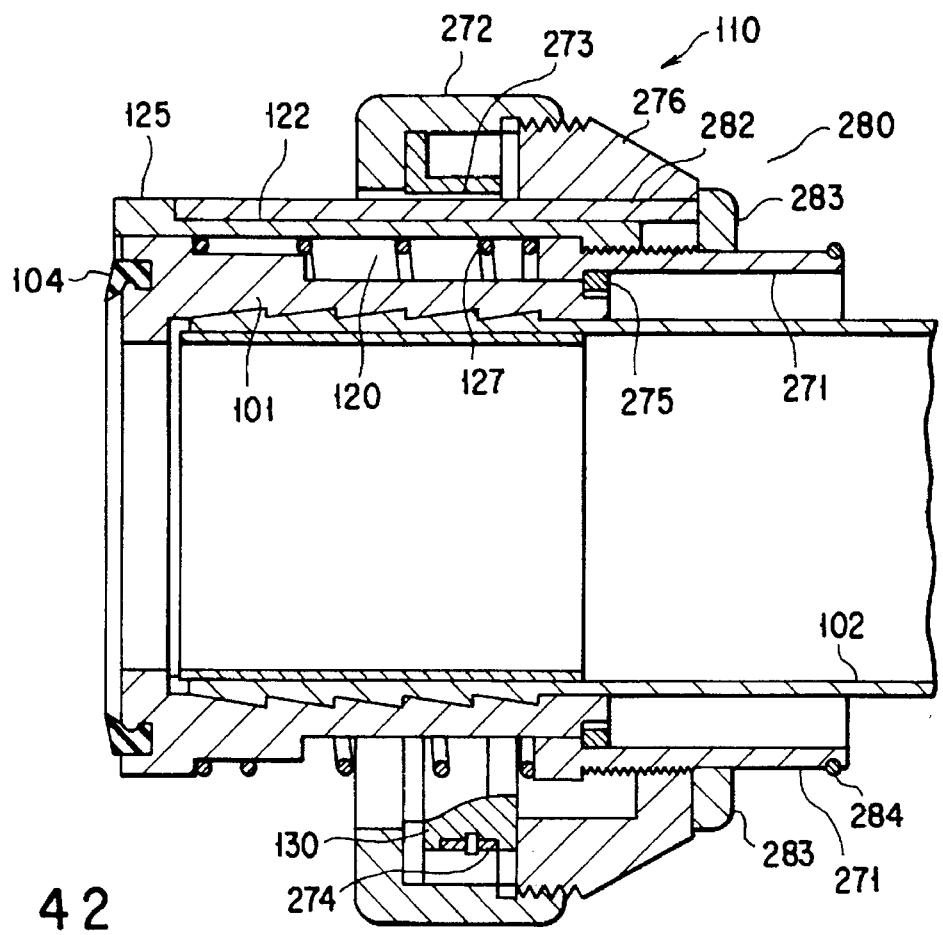
FIG. 42 is a longitudinal sectional view according to the 10th embodiment of the present invention.
Figure 44:
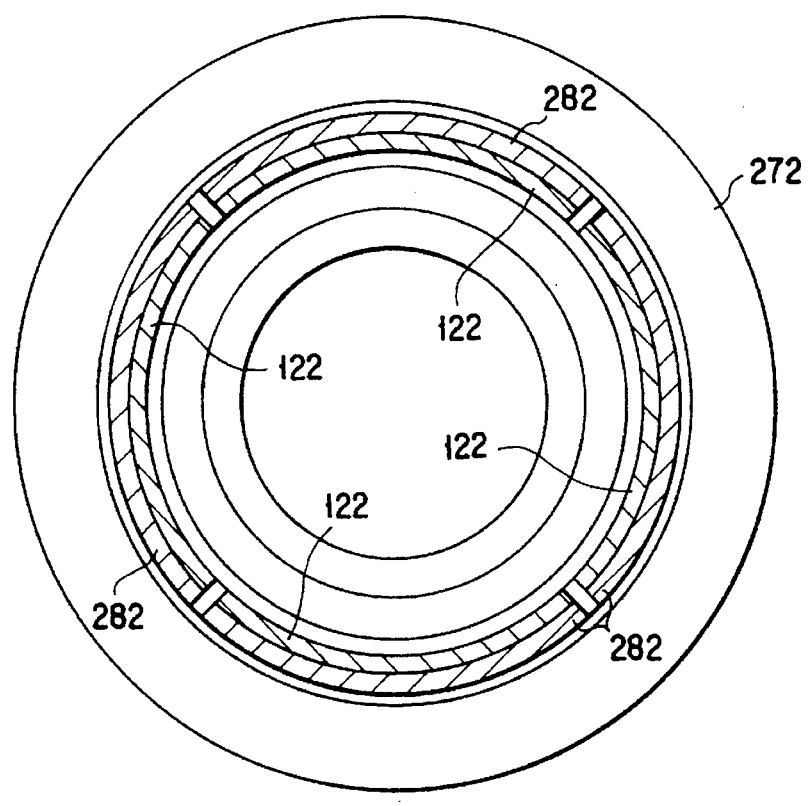
FIG. 44 is a sectional view taken along the line 44—44 of FIG. 43.
Figure 43:
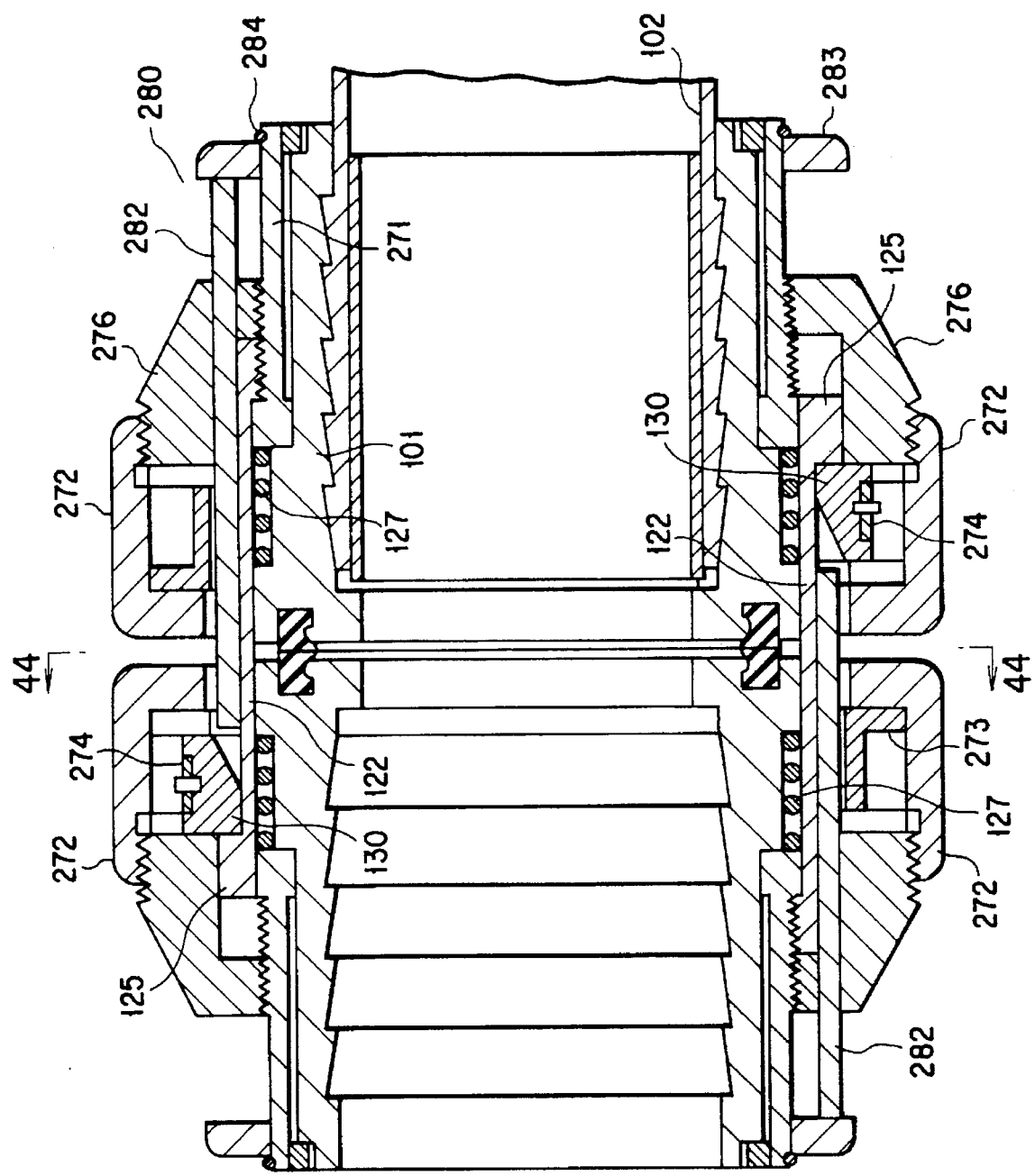
FIG. 43 is a longitudinal sectional view of the coupled state of the 10th embodiment of the present invention.

FIGS. 42 to 44 show the tenth embodiment of the present invention. In this embodiment, a movable cylinder 271 is fitted with each cylindrical body 101 to be axially movable and rotatable. This movable cylinder 271 is biased by a spring 127 to be moved backward. The retreat position of the movable cylinder 271 is regulated by a stop ring 275. A protection cylinder 110 is integrally mounted on the outer circumferential surface of the movable cylinder 271. This protection cylinder 110 is constituted by an inner cylinder 276 and an outer cylinder 272. Reference numeral 273 denotes a retaining ring. The protection cylinder 110 is axially moved together with the movable cylinder 271. Locking pieces 130 are provided in the protection cylinder 110 in the same manner as described above. The locking pieces 130 are biased by a leaf spring 274 inwardly in the radial direction.

Locking members 120 are mounted on the outer circumferential surface of the movable cylinder 271. The locking members 120 are also axially moved together with the movable cylinder 271 and are rotatable together with the movable cylinder 271. In this case, when the movable cylinder 271 is located at its retreat position, the distal ends of locking pieces 122 of the locking members 120 are located on substantially the same plane as that of the distal end face of a cylindrical body 101.

Disengaging mechanisms 280 that disengage the locking pieces 130 from the locking pieces 122 have an arrangement as follows. More specifically, each disengaging mechanism 280 has a pair of disengaging pieces 282. The disengaging pieces 282 have an arcuated section almost the same as that of the locking pieces 122. The disengaging pieces 282 are placed on the outer side surfaces of the locking pieces 122 to be axially slidable with respect to the locking pieces 122. The proximal end portions of these disengaging pieces 282 are mounted to an annular member 283. The annular member 283 is guided to be axially movable with respect to the outer circumferential surface of the movable cylinder 271. Thus, the annular member 283 and the disengaging pieces 282 are guided to be axially movable with respect to the movable cylinder 271, the locking members 120, and the protection cylinder 110.

In this embodiment, when couplers 101A and 101B are not coupled to each other, the locking members 120 have been moved backward together with the corresponding movable cylinders 271 and protection cylinders 110, and the distal ends of the locking members 120 do not project from the distal end faces of the corresponding cylindrical bodies 101. When the couplers 101A and 101B are to be coupled, the distal end faces of the cylindrical bodies 101 are abutted against each other, and the locking members 120 are axially moved forward together with the movable cylinders 271 and the protection cylinders 110, thereby engaging the distal end portions of the locking pieces 122 with the opposite locking pieces 130. In this case, the locking pieces 122 and the locking pieces 130 in the protection cylinders 110 are rotational together with the movable cylinders 271 with respect to the cylindrical bodies 101. Thus, after the cylindrical bodies 101 are abutted against each other, the locking pieces 122 and the locking pieces 130 in the protection cylinders 110 are rotated together with the corresponding movable cylinders 271 to perform positioning in the circumferential direction, thereby facilitating the coupling operation.

To disengage these locking pieces, the disengaging pieces 282 are moved forward. Then, the distal end portions of the disengaging pieces 282 are brought into contact with the inclined surface portions of the locking pieces 130 to move the locking pieces 130 outwardly in the radial direction, thereby disengaging the locking pieces 130 from the locking pieces 122.

This embodiment has the same arrangement as that of the fourth embodiment described above except for the above respects. Portions of the tenth embodiment identical to those of the fourth embodiment are denoted by the same reference numerals, and a description thereof will be omitted.

The present invention is not limited to the embodiments described above, in which each coupler has a pair of locking members and a pair of to-be-locked members. It may be applied to a small coupling apparatus in which each coupler has one locking member and one to-be-locked member, and also to a large coupling apparatus in which each coupler has three or more locking members and three or more to-be-locked members.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A coupling apparatus comprising a pair of couplers that are to be coupled to each other, wherein:

said pair of couplers have substantially the same structure and are complementary to each other;

said couplers respectively comprising cylindrical bodies having distal end faces that are abutted against each other when said couplers are coupled to each other;

said cylindrical bodies each including a locking member and a to-be-locked member, said locking member projecting axially from each cylindrical body towards the to-be-locked member of the other cylindrical body when said couplers are in a coupled state, said to-be-locked member being supported for radial movement relative to the respective cylindrical body and being biassed radially inwards to a locking position, said locking members and said to-be-locked members being axially opposed to one another in an arrangement in which in said coupled state said distal end faces of said cylindrical bodies are brought into abutment against each other, said locking members radially displace said to-be-locked members against the radial bias thereof after which said to-be-locked members are biassed radially inwards to said locking positions thereof; and disengaging mechanisms on said couplers for displacing said to-be-locking members radially outwards to disengage said to-be-locked members from said locking members and enable the couplers to be uncoupled;

and wherein said locking members are movable in the axial direction with respect to said cylindrical bodies and comprise elastic means for biasing said locking members to move backward in a direction away from distal ends of said cylindrical bodies; and when said couplers are in an uncoupled state, said locking members are moved to a retreat position by said elastic means and distal end portions of said locking members are retained adjacent to said cylindrical bodies; and when said pair of couplers are in said coupled state, said locking members are moved forward against a biasing force of said elastic means and engage said to-be-locked members.

2. An apparatus according to claim 1, wherein said locking member of each of said couplers comprises a pair of locking pieces each cooperating with a respective said to-be-locked member of a pair of said to-be-locked members, said pair of locking pieces are separated from each by 180° in a circumferential direction of said cylindrical bodies, said locking pieces having a width of about 90° in the circumferential direction of said cylindrical bodies, said pair of couplers are coupled to each other with an angular shift of about 90° from each other in the circumferential direction, and said couplers are moved axially towards one another such that the pair of locking pieces of one coupler are fitted between said pair of locking pieces of the other of said couplers.

3. An apparatus according to claim 2, wherein said locking members and said to-be-locked members are rotatable with respect to said cylindrical bodies.

4. An apparatus according to claim 1, wherein said disengaging mechanisms include disengaging pieces which are movable in an axial direction of said cylindrical bodies to contact said to-be-locked members and disengage said to-be-locked members from said locking members.

5. An apparatus according to claim 4, wherein while said pair of couplers are coupled to each other, said pair of couplers are disconnectable only when said disengaging pieces of said couplers are moved towards each other.

6. An apparatus according to claim 1, wherein said disengaging mechanisms respectively comprise substantially elliptic elastic rings, said to-be-locked members of each disengaging mechanism are mounted on an inner circumference of a corresponding one of said substantially elliptic elastic rings at two portions on a minor axis thereof; said to-be-locked members are biased inwardly in a radial direction by an elastic force of said elastic rings and engage said locking members; and when each of said substantially elliptic elastic rings is depressed at two portions on a major axis thereof inwardly in the radial direction, said substantially elliptic elastic rings are deformed to become substantially circular, and said to-be-locked members are moved outwardly in the radial direction, thereby disengaging said to-be-locked members from said locking members.

7. An apparatus according to claim 1, wherein said disengaging mechanisms respectively comprise rings which are movable relative to said cylindrical bodies; said rings and said to-be-locked members include a plurality of permanent magnets in a predetermined arrangement in which when N and S poles of said permanent magnets of said rings correspond to N and S poles of said permanent magnets of said to-be-locked members, said to-be-locked members are biased inwardly in the radial direction by a repulsive force of said permanent magnets and engage said locking members; and when said rings are moved relative to said cylindrical bodies so that said N and S poles of said permanent magnets of said rings correspond to S and N poles of said permanent magnets of said to-be-locked members, said to-be-locked members are moved outwardly in the radial direction by an attractive force between said permanent magnets of said rings and said permanent magnets of said to-be-locked members, thereby disengaging said to-be-locked members from said locking members.

8. An apparatus according to claim 7, wherein said rings are movable relative to said cylindrical bodies by rotation of said rings in a circumferential direction of said cylindrical bodies.

9. An apparatus according to claim 7, wherein said rings are movable relative to said cylindrical bodies in an axial direction of said cylindrical bodies.

10. An apparatus according to claim 1, wherein said distal end faces of said cylindrical bodies of said pair of couplers respectively include packing members made of an elastic material, and when said pair of couplers are coupled to each other, said packing members are interposed between said distal end faces of said cylindrical bodies, thereby maintaining a hermetic seal.

11. An apparatus according to claim 1, wherein said pair of couplers respectively include protection cylinders secured to said couplers and in contact with and covering side surfaces of said locking members and said to-be-locked members, for preventing a deformation and shift of said locking members and said to-be-locked members.

12. An apparatus according to claim 11, wherein said side surfaces of said locking members which contact said protection cylinders are inner side surfaces of said locking members.

13. An apparatus according to claim 11, wherein said side surfaces of said locking members which contact said protection cylinders are outer side surfaces of said locking members.

14. An apparatus according to claim 1, wherein said distal end faces of said cylindrical bodies of said pair of couplers have respective communication wire connection terminals which are connected to one another when said couplers are coupled to each other.

15. An apparatus according to claim 1, wherein said pair of couplers are respectively connected to hoses to hydraulically connect said hoses to each other.

16. An apparatus as claimed in claim 1, wherein said to-be-locked members have inner surfaces which are contacted by said locking member when said to-be-locked members are radially displaced by said locking members, said inner surfaces being inclined relative to axes of cylindrical bodies.

17. An apparatus as claimed in claim 1, wherein said locking member on each cylindrical body includes a plurality of angularly spaced locking pieces arranged so that the locking pieces of one coupler fit between the locking pieces of the other coupler when the couplers are engaged and disengaged.

18. An apparatus as claimed in claim 1, wherein said locking members include locking portions projecting radially outwards of said locking members to engage said to-be-locked members and radially displace the same as said end faces of said cylindrical bodies approach one another after which said locking portions axially pass said to-be-locked members as said end faces are brought into abutment with one another, said to-be-locked members moving to said locking positions when said locking portions pass said to-be-locked members thereby blocking axial movement of said locking portions in a reverse direction.

19. An apparatus as claimed in claim 1, wherein said locking member of each coupler has an arcuate shape with an inner circumferential surface which is slidably guided on an outer circumferential surface of said cylindrical body of the other coupler during axial movement of said cylindrical bodies when the couplers are coupled and uncoupled.

* * * * *